United States Patent
Tetsukawa et al.

(10) Patent No.: US 6,970,332 B2
(45) Date of Patent: Nov. 29, 2005

(54) MAGNETORESISTIVE HEAD WITH SPIN VALVE FILM MAGNETIC SENSOR ELEMENT

(75) Inventors: Hiroki Tetsukawa, Kanagawa (JP); Yutaka Soda, Kanagawa (JP); Akihiko Okabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 177 days.

(21) Appl. No.: 10/627,839

(22) Filed: Jul. 25, 2003

(65) Prior Publication Data

US 2004/0075956 A1  Apr. 22, 2004

(30) Foreign Application Priority Data

| Jul. 31, 2002 | (JP) | ............................. 2002-223987 |
| Dec. 2, 2002 | (JP) | ............................. 2002-349907 |
| Dec. 20, 2002 | (JP) | ............................. 2002-370519 |
| Dec. 20, 2002 | (JP) | ............................. 2002-370520 |
| Apr. 11, 2003 | (JP) | ............................. 2003-107774 |

(51) Int. Cl.[7] .............................................. G11B 5/39
(52) U.S. Cl. ................................................. 360/324.1
(58) Field of Search ........................ 360/324.1–324.12

(56) References Cited

U.S. PATENT DOCUMENTS

| 5,742,458 A | * | 4/1998 | Koike et al. | ........... 360/324.11 |
| 5,766,743 A | * | 6/1998 | Fujikata et al. | ............. 428/212 |
| 6,764,778 B2 | * | 7/2004 | Saito et al. | ................. 428/692 |

* cited by examiner

Primary Examiner—A. J. Heinz
(74) Attorney, Agent, or Firm—Robert J. Depke; Trexler, Bushnell, Giangiorgi, Blackstone & Marr

(57) ABSTRACT

An improvement in the corrosion resistance of a magnetoresistive head is aimed for, and a high magnetoresistivity ratio is maintained. In a magnetoresistive head equipped with, as a magnetic sensor element for detecting magnetic signals while in contact with a magnetic recording medium, a spin-valve film, which has a structure where an anti-ferromagnetic layer, a pinned layer in which the direction of magnetization is pinned in a predetermined direction by an exchange-coupling magnetic field at work between itself and the anti-ferromagnetic layer, a free layer in which the direction of magnetization changes in accordance with an external magnetic field, and a non-magnetic layer for magnetically isolating the pinned layer and the free layer are layered, the corrosion potential of the spin-valve film relative to a standard hydrogen electrode measured while immersed in a NaCl solution of a concentration of 0.1 mol/L is specified at +0.4 [V vs. SHE] or above.

24 Claims, 14 Drawing Sheets

MAGNETORESISTIVE HEAD WITH SPIN VALVE FILM MAGNETIC SENSOR ELEMENT

CROSS REFERENCE TO RELATED APPLICATIONS

This application claims priority to Japanese Patent Application Numbers: JP2002-223987 filed Jul. 31, 2002; JP2002-349907 filed Dec. 2, 2002; JP2002-370519 filed Dec. 20, 2002; JP2002-370520 filed Dec. 20, 2002 and JP2003-107774 filed Apr. 11, 2003 respectively which are incorporated herein by reference.

BACKGROUND OF THE INVENTION

1. Field of the Invention

The present invention relates to a magnetoresistive head that uses a spin-valve film as a magnetic sensor element for detecting magnetic signals while in contact with a magnetic recording medium.

2. Description of the Related Art

Magnetoresistive elements (hereinafter referred to as MR elements) utilize magnetoresistive effects where the resistance changes depending on the magnitude and direction of an external magnetic field, and are used in, for example, magnetic heads and the like as magnetic sensor elements for detecting the magnetic field of a signal from a magnetic recording medium.

A magnetic head equipped with such an MR element is generally called a magnetoresistive head (hereinafter referred to as MR head).

As such an MR element, one in which anisotropic magnetoresistive effects are utilized has been in use conventionally, but because its magnetoresistance ratio (MR ratio) is small, one in which a greater MR ratio is exhibited is desired, and in recent years, giant magnetoresistive elements (hereinafter referred to as GMR elements) using spin-valve films have been proposed (see, for example, non-patent document 1 or patent document 1).

A GMR element has a spin-valve film in which a non-magnetic layer is held by and between a pair of magnetic layers, and utilizes so-called giant magnetoresistive effects where the conductance of a sense current flowing in the plane direction with respect to the spin-valve film changes depending on the relative angle of magnetization of the pair of magnetic layers.

Specifically, the spin-valve film has a structure in which an anti-ferromagnetic layer, a pinned layer whose direction of magnetization is pinned in a predetermined direction by an exchange-coupling field at work between itself and the anti-ferromagnetic layer, a free layer whose magnetization direction changes depending on an external magnetic field, and a non-magnetic layer for magnetically isolating the pinned layer and the free layer are stacked.

In a GMR element using a spin-valve film, when an external magnetic field is applied, the magnetization direction of the free layer changes depending on the magnitude and direction of the external magnetic field. When the magnetization direction of the free layer is opposite (anti-parallel) the magnetization direction of the pinned layer, the resistance to the sense current flowing through the spin-valve film becomes greatest. On the other hand, when the magnetization direction of the free layer and the magnetization direction of the pinned layer are the same (parallel), the resistance to the sense current flowing through the spin-valve film becomes smallest.

Therefore, in a magnetic head equipped with such a GMR element (hereinafter referred to as a GMR head), when a given sense current is supplied to the GMR element, the voltage of the sense current flowing through the GMR element changes depending on the magnetic field of signals from a magnetic recording medium, and magnetic signals can be read from the magnetic recording medium by detecting the change in the voltage of the sense current.

In non-patent document 1, an example in which a GMR head is used in a hard disk drive is disclosed.

A hard disk drive has a structure in which, for example, a GMR head is mounted on a head slider attached to the tip of a suspension. The airflow that is generated by the rotation of the magnetic disk makes the head slider float above the signal recording surface of the magnetic disk, and reading operations with respect to the magnetic disk are performed by having magnetic signals that are recorded on the magnetic disk read by the GMR head mounted on the head slider.

Applications of the GMR head above are not limited to magnetic disk apparatuses, and in recent years, applications in magnetic tape apparatuses such as tape streamers and the like are being considered.

For example, a tape streamer that adopts a helical scan system has a structure in which a GMR head is positioned on the outer surface portion of a rotary drum such that it is oblique in accordance with the azimuth angle with respect to the direction that is substantially orthogonal to the running direction of the magnetic tape.

In the tape streamer, the magnetic tape runs obliquely with respect to the rotary drum, the rotary drum rotates, and reading operations for the magnetic tape are performed by reading the magnetic signals recorded on the magnetic tape while the GMR head mounted on the rotary drum and the magnetic tape slide in contact with each other.

In the tape streamer, because it is preferable that the distance between the GMR head and the magnetic tape, otherwise known as spacing, be kept small, in this respect, it is desirable that the surface of the magnetic tape be calendered.

However, as the surface of the magnetic tape becomes smoother, the contact area between the magnetic tape and the outer peripheral portion of the rotary drum increases, and the friction at work between the magnetic tape and the rotary drum while the tape is running becomes greater, thereby causing the magnetic tape and the rotary drum to stick, and it becomes difficult for the magnetic tape to run smoothly.

Therefore, the contact area with the outer peripheral portion of the rotary drum is made smaller, and the friction at work between the magnetic tape and the rotary drum smaller, by providing small protrusions on the surface of the magnetic tape using $SiO_2$ fillers, organic fillers and the like.

In addition, a protective film, such as a DLC (diamond-like carbon) film or the like, for preventing damage or corrosion is formed on the surface of the magnetic tape.

In the hard disk drive described above, reading operations are performed under conditions in which the GMR head is not in contact with the signal recording surface of the magnetic disk. In addition, Cu is ordinarily used for the non-magnetic layer constituting part of the spin-valve film, and on the surface of the GMR head that faces the magnetic disk, a protective film, such as a DLC film or the like, for preventing Cu from becoming corroded is formed.

[Non-Patent Document 1]

"Giant Magnetoresistance in Soft Ferromagnetic Multilayers" Physical Review B, Volume 43, Number 1, pages 1297~1300

[Patent Document 1]
Japanese Patent Application Publication Hei-8-111010

SUMMARY OF THE INVENTION

However, in tape streamers, for which the use of GMR heads is being considered currently, because reading operations are performed under conditions in which the GMR head and the magnetic tape are in contact, if a protective film for preventing corrosion, as mentioned above, is formed on the surface of the GMR head that is placed in sliding contact with the magnetic tape, the protective film wears during reading operations due to the contact between the small protrusions and protective film formed on the surface of the magnetic tape.

Further, because the protective film formed on the surface of the GMR head that contacts the medium creates a space between the magnetic tape, it causes degradation in the short wavelength recording/reproducing characteristics of the GMR head.

Therefore, in magnetic tape apparatuses such as tape streamers, it can be considered inappropriate to form a protective film on the surface of the GMR head that contacts the recording medium.

For this reason, in magnetic tape apparatuses, the surface of the GMR head that contacts the recording medium is in direct contact with the atmosphere, and there was a problem in that when used under harsh conditions such as high temperature and humidity conditions, seawater atmosphere or the like, corrosion was more likely to occur.

The sensitivity of the GMR head is determined by the sense current flowing through the spin-valve film. Each layer constituting this spin-valve film is formed with a thickness on the order of several nanometers, and even with the slightest corrosion, the electrical resistance of each layer changes. Therefore, the occurrence of corrosion in the GMR head on its surface that contacts the recording medium causes a significant degradation in the head characteristics of the GMR head.

In patent document 1 mentioned above, considerations for improving the corrosion resistance of magnetoresistive heads used in hard disks are given, however, because in hard disk apparatuses the magnetic head does not directly contact the recording medium, it should be obvious that the amount of damage is greater in tape systems due to friction with the magnetic head.

Further, in hard disk apparatuses, because the medium is sealed airtight through packaging, and is thus not exposed to external atmosphere, damage to the magnetic head due to fine dust and the like are again considered more severe in tape systems. Therefore, achieving an improvement in the corrosion resistance of GMR heads used in magnetic tape apparatuses is even more important than it is for hard disk drives.

Thus, through the present invention and in view of the problems described above, there is provided a magnetoresistive head which makes it possible to perform appropriate reading operations with respect to a magnetic recording medium by being equipped with a spin-valve film that has good corrosion resistance for a magnetic sensor element for detecting magnetic signals while in contact with the magnetic recording medium and that maintains a high MR ratio.

A magnetoresistive head according to an embodiment of the present invention includes, as a magnetic sensor element for detecting magnetic signals while in contact with a magnetic recording medium, a spin-valve film having a structure in which an anti-ferromagnetic layer, a pinned layer in which the direction of magnetization is fixed in a predetermined direction by an exchange-coupling magnetic field at work between itself and the anti-ferromagnetic layer, a free layer in which the direction of magnetization changes with the external magnetic field, and a non-magnetic layer for magnetically isolating the pinned layer and the free layer are stacked. The corrosion potential of the spin-valve film relative to a standard hydrogen electrode when measured while immersed in a NaCl solution of a concentration of 0.1 mol/L is +0.4 [V vs. SHE] or above.

A magnetoresistive head according to an embodiment of the present invention includes, as a magnetic sensor element for detecting magnetic signals while in contact with a magnetic recording medium, a spin-valve film having a structure in which an anti-ferromagnetic layer, a pinned layer in which the direction of magnetization is fixed in a predetermined direction by an exchange-coupling magnetic field at work between itself and the anti-ferromagnetic layer, a free layer in which the direction of magnetization changes with the external magnetic field, and a non-magnetic layer for magnetically isolating the pinned layer and the free layer are stacked. The corrosion potential of each of the anti-ferromagnetic layer, the pinned layer, the free layer and the non-magnetic layer constituting the spin-valve film relative to a standard hydrogen electrode when measured while immersed in a NaCl solution of a concentration of 0.1 mol/L is +0.4 [V vs. SHE] or above.

According to a magnetic head of an embodiment, of the present invention, even when used in tape streamers, the spin-valve film and each of the layers constituting the spin-valve film exhibit high corrosion resistance. Therefore, even under harsh conditions, a high MR ratio can be maintained.

According to a magnetoresistive head of an embodiment of the present invention, by specifying the corrosion potential of the spin-valve film relative to a standard hydrogen electrode so as to ensure good corrosion resistance and make it possible to maintain a high MR ratio, occurrences of corrosion even under harsh conditions, such as high temperature and humidity conditions, seawater atmosphere or the like, can be prevented, and it becomes possible to perform appropriate reading operations on a magnetic recording medium even in cases where a protective film is not formed on the surface of the magnetoresistive head that contacts the magnetic recording medium.

In addition, according to an embodiment of a magnetoresistive head of the present invention, by appropriately selecting the material and composition of each layer constituting the spin-valve film, occurrences of corrosion may be prevented, and good corrosion resistance may be obtained.

In addition, according to an embodiment of a magnetoresistive head of the present invention, by appropriately selecting the material composition of the pinned layer and the free layer of the spin-valve film, a reduction in noise may be achieved.

DESCRIPTION OF THE PREFERRED EMBODIMENTS

Hereinafter, embodiments of magnetoresistive heads according to the present invention will be described in detail with reference to the drawings.

An example of a magnetic tape apparatus to which an embodiment of a magnetoresistive head of the present invention is applied will be described.

Figure 1:
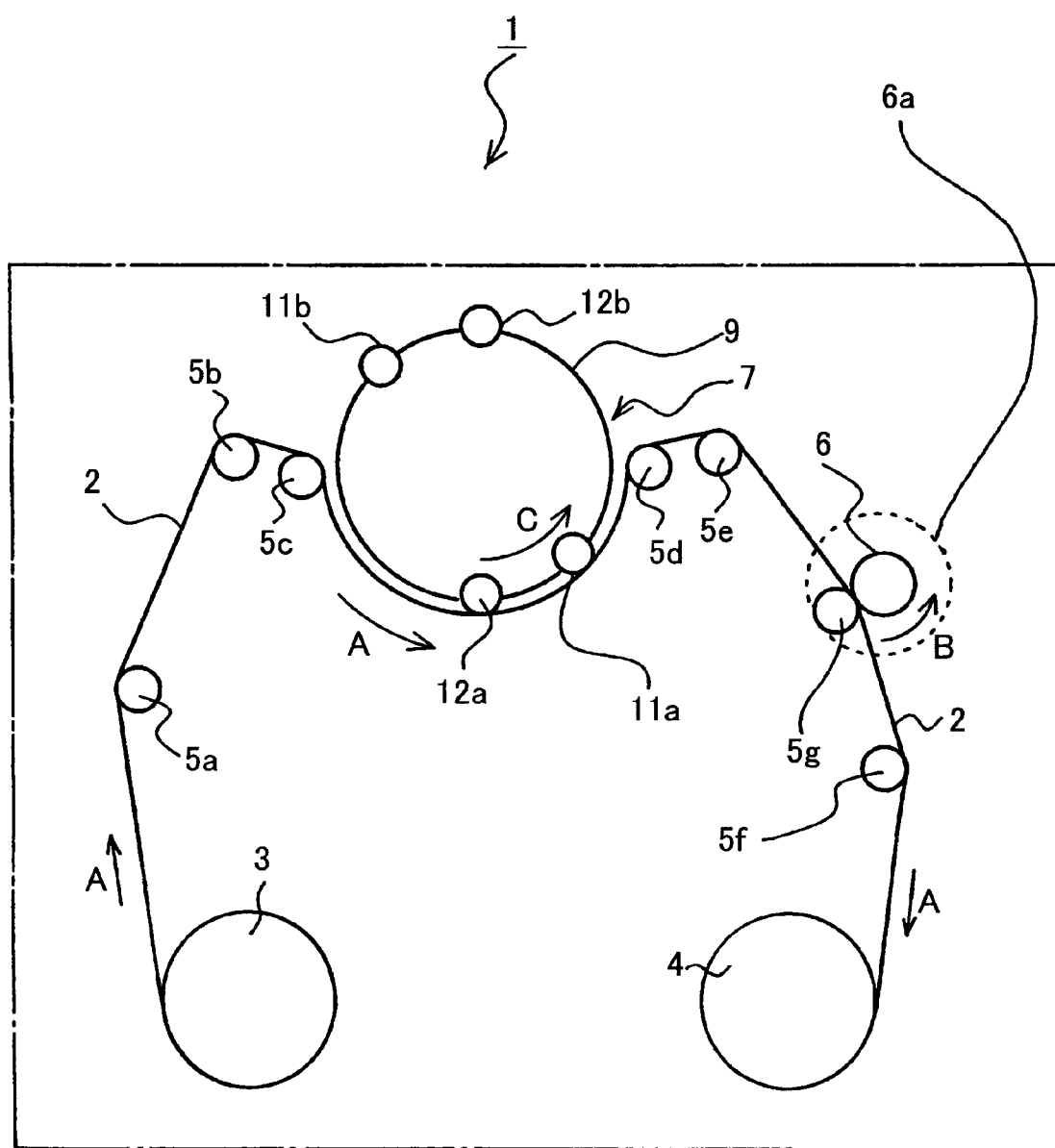
FIG. 1 is a schematic plan view of a recording/reproducing apparatus for magnetic tapes.

A magnetic tape apparatus 1 shown in FIG. 1 records and/or reads signals to and from a magnetic tape 2 by the helical scan method.

The magnetic tape apparatus 1 is provided with a tape supply reel 3 for supplying the magnetic tape 2, a take-up reel 4 for winding the magnetic tape supplied from the supply reel 3, and a plurality of guide rollers 5a to 5f for guiding the magnetic tape 2 between the supply reel 3 and the take-up reel 4. The magnetic tape 2 runs in the direction indicated by arrows A in FIG. 1.

Further, between guide rollers 5e and 5f, there are provided, as tape running means, a pinch roller 5g that contacts the magnetic tape 2, a capstan 6 which pinches the magnetic tape 2 together with the pinch roller 5g, and a capstan motor 6a for rotating the capstan 6.

The magnetic tape 2, which is pinched between the pinch roller 5g and the capstan 6 that is rotated by the capstan motor 6a in the direction indicated by arrow B, runs in the direction indicated by arrows A at and with a constant speed and tension.

In the magnetic tape apparatus 1, a head drum 7 for performing recording operations or reading operations on the magnetic tape 2 is provided between the guide rollers 5c and 5d.

Figure 2:
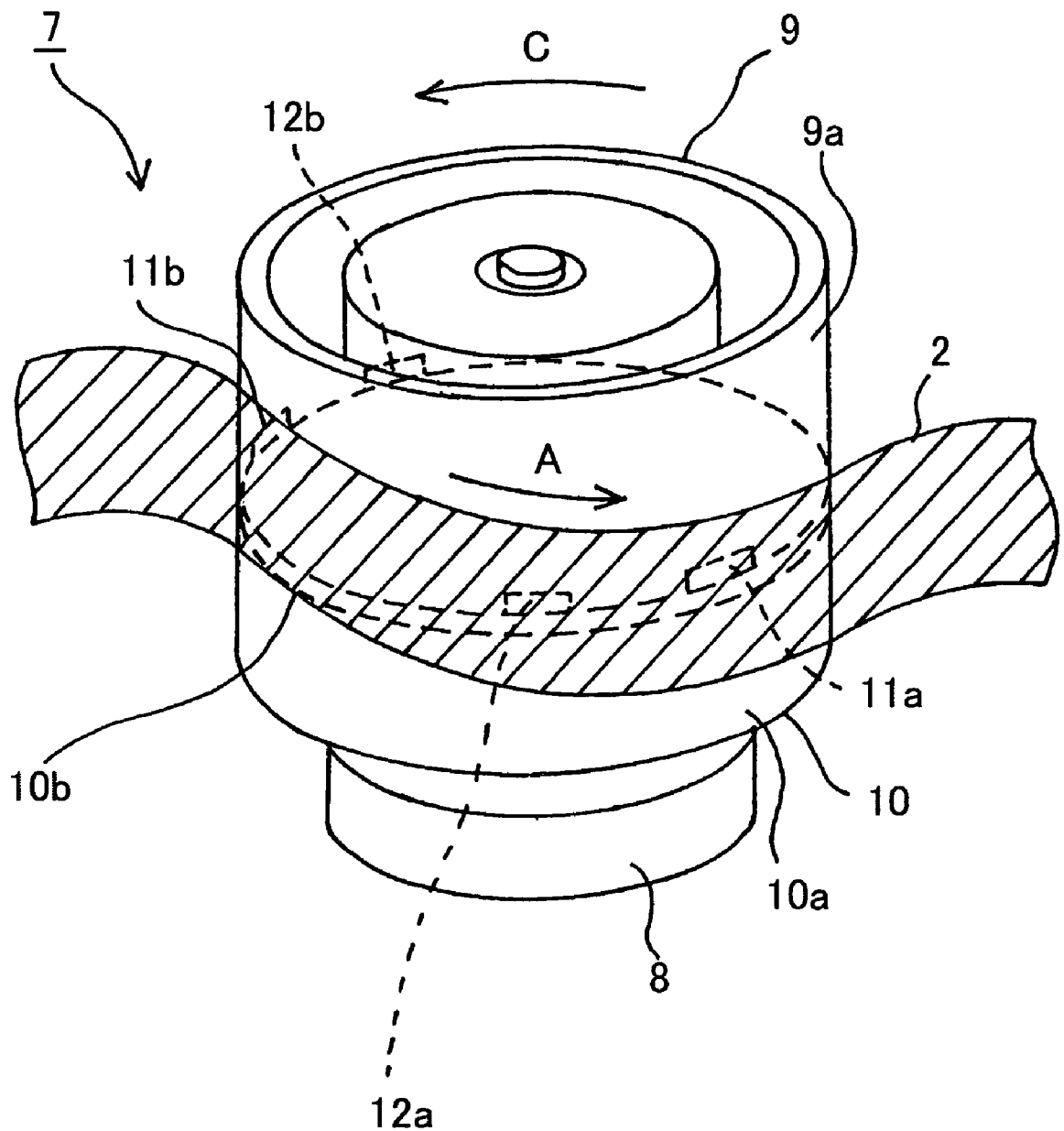
FIG. 2 is a schematic perspective view of a head drum for a recording/reproducing apparatus.

As shown in FIG. 2, the head drum 7 has a rotary drum 9, which is rotated by a drive motor 8 in the direction indicated by arrow A, and a stationary drum 10 fixed on a base (not shown). An outer surface portion 9a of the rotary drum 9 and an outer surface portion 10a of the stationary drum are continuous.

The magnetic tape 2 is guided by the guide rollers shown in FIG. 1, and runs in a state in which it is helically wound around the outer surface portions 9a and 10a of the rotary drum 9 and the stationary drum 10 with an angular range of approximately 180 degrees.

Further, on the outer surface portion 10a of the stationary drum 10, there is provided a lead guide 10b for guiding the magnetic tape 2, thereby causing the magnetic tape 2 to run obliquely relative to the direction of rotation of the rotary drum 9.

On the outer surface portion 9a of the rotary drum 9, there are mounted a pair of recording magnetic heads 11a and 11b for performing a signal recording operation on the magnetic tape 2, and a pair of reproducing magnetic heads 12a and 12b for performing a signal reproduction operation on the magnetic tape 2.

The recording magnetic head 11a and the recording magnetic head 11b have a 180-degree phase difference, and the reproducing magnetic head 12a and the reproducing magnetic head 12b similarly have a 180-degree phase difference. In other words, they are disposed on opposite sides of the outer surface portion 9a of the rotary drum 9.

Further, the pair of recording magnetic heads 11a and 11b and the pair of reproducing magnetic heads 12a and 12b are disposed in such a manner that their recording gap and their reproducing gap become oblique in accordance with the azimuth angle with respect to the direction that is substantially orthogonal to the running direction of the magnetic tape 2.

Thus, in the head drum 7, a signal recording or reproducing operation is performed while the magnetic tape 2 contacts the pair of recording magnetic heads 11a and 11b and the pair of reproducing magnetic heads 12a and 12b by having the magnetic tape 2, which contacts both the outer surface portions 9a and 10a of the rotary drum 9 and the stationary drum 10, respectively, run in the direction of arrow A shown in FIG. 2, while the rotary drum 9 is rotated by the drive motor 8 in the direction of arrow C.

Specifically, at the time of recording, the recording magnetic head 11a forms on the magnetic tape 2 a recording track with a predetermined track width by applying a magnetic field in response to a recording signal, and the recording magnetic head 11b forms a recording track with a predetermined track width adjacent to the recording track formed above by applying a magnetic field in response to a recording signal.

Then, by repeatedly forming recording tracks on the magnetic tape 2 with the pair of recording magnetic heads 11a and 11b, signals are continuously recorded on the magnetic tape 2.

On the other hand, at the time of reproduction, the reproducing magnetic head 12a detects a magnetic field of a signal from a recorded track recorded on the magnetic tape 2 by the recording magnetic head 11a, while the reproducing magnetic head 12b detects the magnetic field of a signal from a recorded track recorded by the recording magnetic head 11b. By repeatedly detecting the magnetic field of signals from recorded tracks by means of these reproducing magnetic heads 12a and 12b, the signals recorded on the magnetic tape 2 are reproduced continuously.

Figure 3:
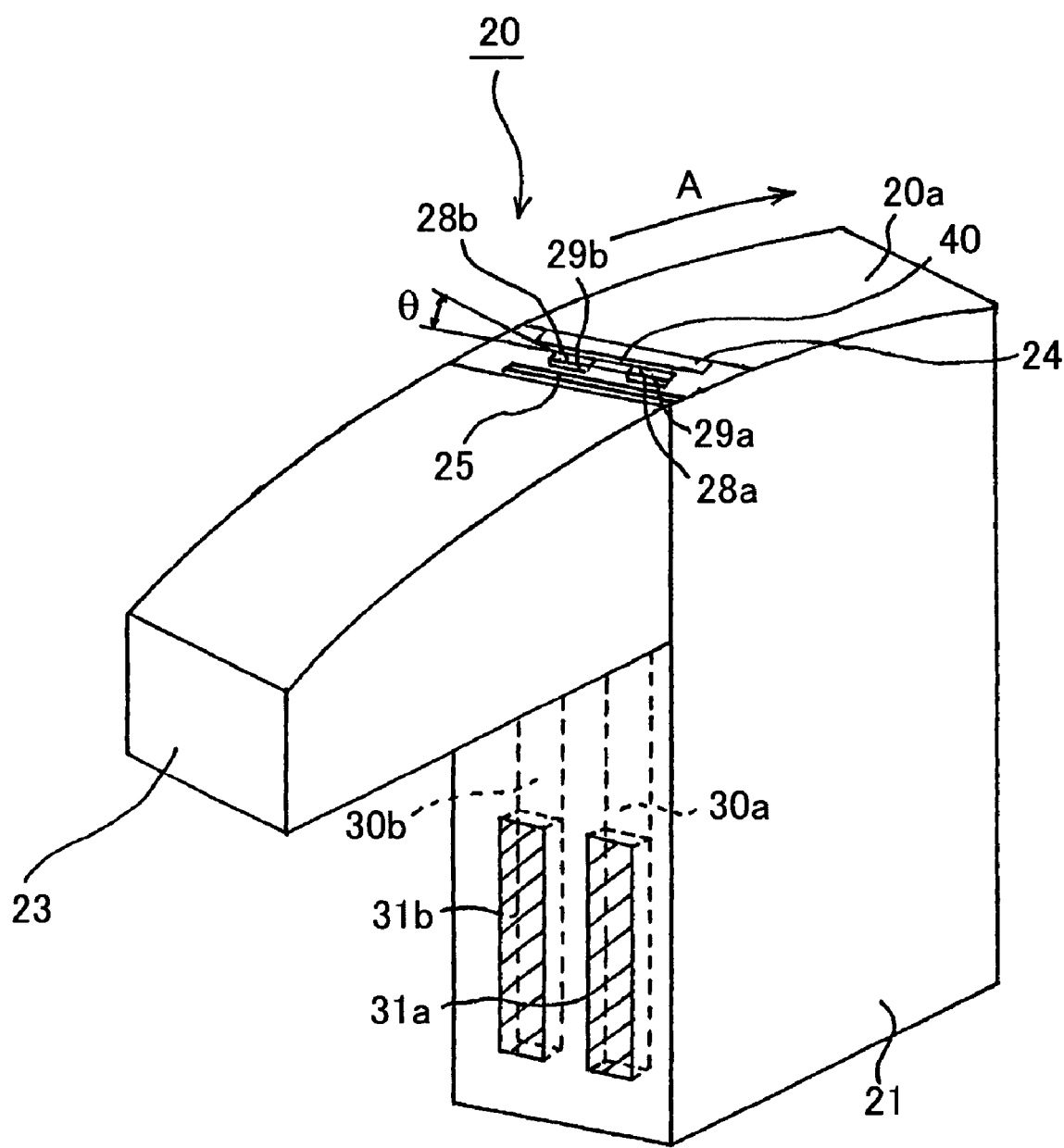
FIG. 3 is a schematic perspective view of a magnetoresistive head of an embodiment of the present invention.
Figure 4:
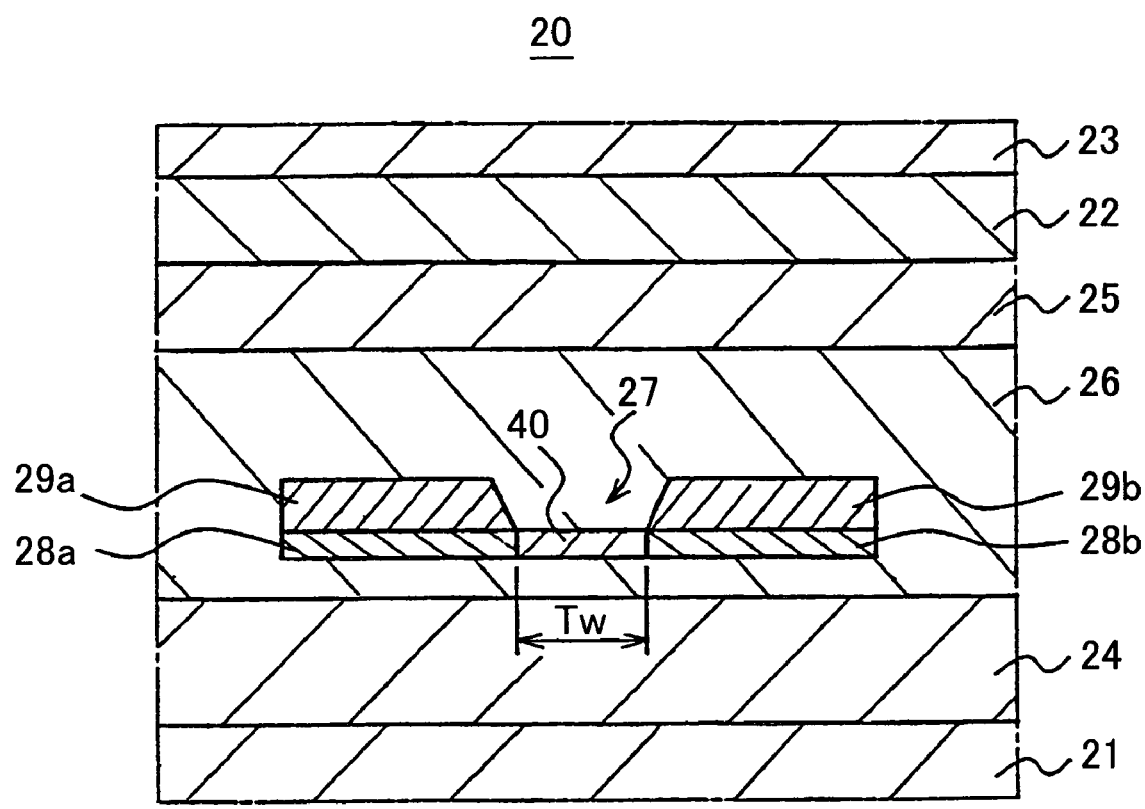
FIG. 4 is an end view of a GMR head as viewed from the medium sliding surface side.

With reference to FIGS. 3 and 4, a magnetoresistive head according to an embodiment of the present invention will be described in detail.

A magnetoresistive head 20 shown in FIG. 3 is a so-called giant magnetoresistive head (hereinafter referred to as a GMR head), which is provided with a giant magnetoresistive element (hereinafter referred to as a GMR element), which utilizes a spin-valve film, as a magnetic sensor element for detecting a magnetic signal from a magnetic recording medium.

This GMR head 20 is more sensitive and has a higher reproductive output than an inductive type magnetic head, which records/reproduces information utilizing electromagnetic induction, or an anisotropic magnetoresistive head, and is suitable for high density recording. Therefore, in the magnetic tape apparatus 1 described above, by using this GMR head 20 as the pair of reproducing magnetic heads 12a and 12b, recording of an even higher density can be achieved.

Specifically, the reproducing magnetic heads 12a and 12b have a structure, as shown in FIG. 4, in which a magnetic shield layer 24, a GMR element 27, a gap layer 26 and a shield layer 25 are sequentially formed on a core member 21 through thin film forming techniques, such as plating, sputtering, vapor deposition or the like, and a second core member 23 is adhered with a protection film 22 in between.

Further, a medium sliding surface 20a of the reproducing magnetic heads 12a and 12b that contact the magnetic tape 2 has a curved surface curved in substantially a circular arc along the running direction of the magnetic tape 2 as indicated by arrow A in FIG. 3. A reproduction gap facing outward from the medium sliding surface 20a is disposed obliquely in accordance with the azimuth angle relative to a direction that is substantially orthogonal to the running direction of the magnetic tape 2.

The pair of reproducing magnetic heads 12a and 12b have a similar construction except that their azimuth angles, are opposite in phase. Therefore, in the following description, the pair of reproducing magnetic heads 12a and 12b will be referred to collectively as the GMR head 20.

The GMR head 20 has a structure in which, as shown in FIG. 4, a magnetoresistive element (GMR element 27) is placed between a pair of upper and lower magnetic shield layers 24 and 25 via a gap layer 26.

The pair of magnetic shield layers 24 and 25 are made of a soft magnetic film having a sufficient width to magnetically shield the GMR element 27, and by sandwiching the GMR element 27 therebetween via the gap layer 26, they function such that, of the magnetic fields of the signals from the magnetic tape 2, those that are not subject to reproduction are not drawn into the GMR element 27.

In other words, in the GMR head 20, the magnetic fields of signals that are not subject to reproduction by the GMR element 27 are led to the pair of magnetic shield layers 24 and 25, and only the magnetic fields of signals that are subject to reproduction are led to the GMR element 27. Thus, the frequency characteristics and resolution of the GMR element 27 can be improved.

The gap layer 26 includes a non-magnetic non-conductive film, which magnetically isolates the GMR element 27 and the pair of magnetic shield layers 24 and 25. The space between the pair of magnetic shield layers 24 and 25 and the GMR element 27 becomes the gap length.

The GMR element 27 includes a spin-valve film 40, and utilizes so-called giant magnetoresistive effects where the conductance of a sense current flowing in an in-plane direction through the spin-valve film changes depending on the relative angle of magnetization of the pair of magnetic films.

Figure 5A:
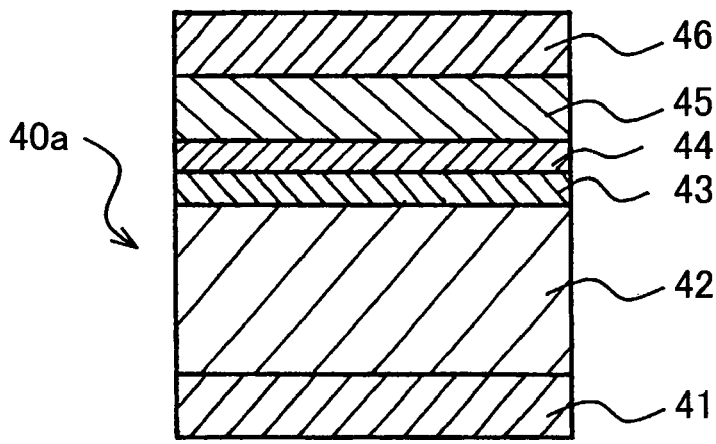
FIGS. 5A, 5B and 5C are schematic sectional views of spin-valve films of a bottom type, a top type and a dual type, respectively.
Figure 5B:
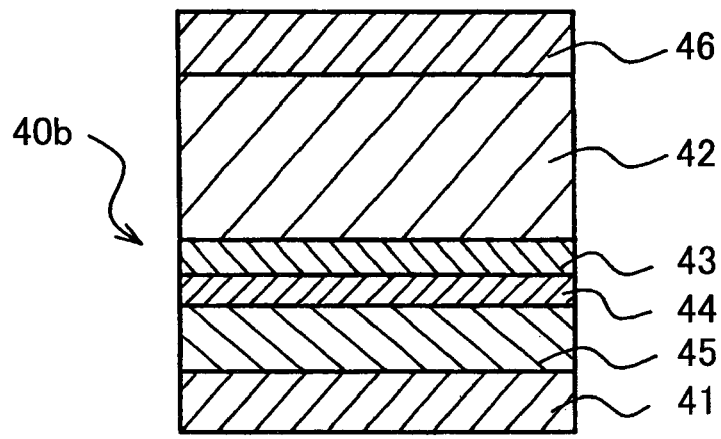
Figure 5C:
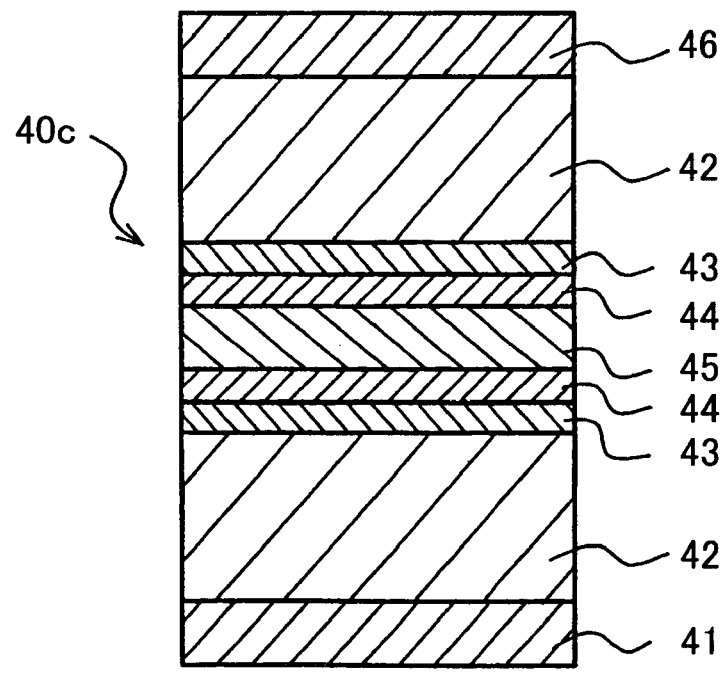

Examples of the spin-valve film 40 include, for example: a bottom type spin-valve film 40a having a structure in which, as shown in FIG. 6A, a foundation layer 41, an anti-ferromagnetic layer 42, a pinned layer 43, a non-magnetic layer 44, a free layer 45 and a protection layer 46 are sequentially layered; a top type spin-valve film 40b having a structure in which, as shown in FIG. 5B, a foundation layer 41, a free layer 45, a non-magnetic layer 44, a pinned layer 43, an anti-ferromagnetic layer 42 and a protection layer 46 are sequentially layered; and a dual type spin-valve film 40c having a structure in which, as shown in FIG. 5C, a foundation layer 41, an anti-ferromagnetic layer 42, a pinned layer 43, a non-magnetic layer 44, a free layer 45, a non-magnetic layer 44, a pinned layer 43, an anti-ferromagnetic layer 42 and a protection layer 46 are sequentially layered.

The pinned layer 43 forming part of the spin-valve film is disposed adjacent to the anti-ferromagnetic layer 42 so that its magnetization direction is pinned in a predetermined direction by an exchange-coupling magnetic field at work between the anti-ferromagnetic layer 42 and itself.

On the other hand, by being magnetically isolated from the pinned layer 43 via the non-magnetic layer 44, the free layer 45 can have its magnetization direction altered easily in response to a weak external magnetic field.

Therefore, in the spin-valve film 40, when an external magnetic field is applied, the magnetization direction of the free layer 45 changes in response to the magnitude and the direction of the external magnetic field. When the direction of magnetization of the free layer 45 is opposite (anti-parallel) to the direction of magnetization of the pinned layer 43, the resistance to the current flowing through the spin-valve film 40 becomes greatest.

On the other hand, when the direction of magnetization of the free layer 45 is the same (parallel) as the direction of magnetization of the pinned layer 43, the resistance to the current flowing through the spin-valve film 40 becomes smallest.

Thus, since its resistance changes in response to the external magnetic field applied thereto, the spin-valve 40 functions as a magnetic sensor element for sensing a magnetic signal from the magnetic tape 2 by reading changes in resistance.

The foundation layer 41 and the protection layer 46 are there to suppress an increase in resistivity of the spin-valve film 40, and may be made of, for example, Ta or the like.

Further, in order to stabilize the operation of the GMR element 27, as indicated in FIGS. 3 and 4, there are provided on both ends of the spin-valve film 40 in the longitudinal direction a pair of permanent magnetic films 28a and 28b for applying a bias magnetic field to the GMR element 27.

The width of the portion interposed between the pair of permanent magnetic films 28a and 28b corresponds to a reproducing track width Tw of the GMR element 27. Further, on the pair of permanent magnetic films 28a and 28b, there are provided a pair of resistance lowering films 29a and 29b for lowering the resistance of the GMR element 27.

Further, in the GMR element 27, a pair of conductors 30a and 30b for supplying a sense current to the spin-valve film are provided such that they are connected on one end to the permanent magnetic film 28a and the resistance lowering film 29a, and the permanent magnetic film 28b and the resistance lowering films 29b, respectively.

On the other ends of the pair of conductors 30a and 30b, there are provided a pair of external connector terminals 31a and 31b, respectively, for connecting with an external circuit.

The protection film 22 covers the main surface of the first core member 21 on which the GMR head 20 is formed except for the areas from which the external connection terminals 31a and 31b face outward, and the protection film also joins the first core member, on which the GMR head 20 is formed, and the second core member 23.

The GMR head 20 shown in FIGS. 3 and 4 has the GMR element 27 and its surroundings enlarged for purposes of illustration and making its features more easily recognizable. However, in practice, the GMR element 27 is very small in comparison with the first core member 21 and the second core member 23. Therefore, the portion of the GMR head 20 exposed to the outside in the medium sliding surface 20a is almost only the upper end surface where the first and the second core members 21 and 22 are abutted against each other.

The GMR head 20 described above is adhered to a chip base (not shown), and the pair of external connector terminals 31a and 31b are electrically connected to connector terminals provided on the chip base. The GMR head 20 mounted on the chip base is attached to the rotary drum 9 shown in FIG. 2 as the pair of reproducing magnetic heads 12a and 12b.

In the magnetic tape apparatus, because the GMR head 20 performs reproducing operations while in direct contact with the magnetic tape 2, a protection film, such as a DLC (Diamond Like Carbon) film or the like, cannot be formed on the medium sliding surface 20a of the GMR head 20 that contacts the magnetic tape 2. Therefore, in conventional apparatuses, because the medium sliding surface of the conventional GMR head is in direct contact with the atmosphere, there was a problem in that corrosion and the like were likely to occur at high temperatures and high humidity conditions or in seawater atmosphere.

In consideration of the problem described above, the present invention makes it possible to perform an appropriate reading operation on the magnetic tape 2 even in cases where a protection film is not formed on the medium sliding surface 20a of the GMR head 20 by using a spin-valve film which exhibits excellent corrosion resistance and maintains a high MR ratio.

Specifically, the anti-ferromagnetic layer 42 that constitutes part of the spin-valve film 40 is formed using a material having excellent corrosion resistance, a suitable example of which includes, PtMn.

In addition to PtMn, the anti-ferromagnetic layer 42 may also be formed using NiO, IrMn, CrMnPt, , , , —$Fe_2O_3$, RhMn, NiMn, PdPtMn and the like which exhibit excellent corrosion resistance.

The non-magnetic layer 44 that constitutes part of the spin-valve film 40 may be formed using any one of Au, CuAu, CuPd, CuPt, CuNi, CuRu and CuRh, which exhibit excellent corrosion resistance and high conductivity.

If the non-magnetic layer 44 is formed using CuAu, assuming the composition ratio of Cu:Au is $(100-a_1):a_1$ (where $a_1$ indicates atomic %), respectively, the composition range should preferably be $25 \leq a_1 < 100$.

If the nonmagnetic layer 44 is formed using CuPd, assuming the composition ratio of Cu:Pd is $(100-a_3):a_3$ (where $a_3$ indicates atomic %), respectively, the composition range should preferably be $5 \leq a_3 \leq 25$.

If the nonmagnetic layer 44 is formed using CuPt, assuming the composition ratio of Cu:Pt is $(100-a_4):a_4$ (where $a_4$ indicates atomic %), respectively, the composition ratio should preferably be $5 \leq a_4 \leq 20$.

If the nonmagnetic layer 44 is formed using CuRu, assuming the composition ratio of Cu:Ru is $(100-a_5):a_5$ (where $a_5$ indicates atomic %), respectively, the composition range should preferably be $3 \leq a_5 \leq 15$.

If the nonmagnetic layer 44 is formed using CuNi, assuming the composition ratio of Cu:Ni is $(100-a_6):a_6$ (where $a_6$ indicates atomic %), respectively, the composition range should preferably be $25 \leq a_6 \leq 50$.

If the nonmagnetic layer 44 is formed using CuRh, assuming the composition ratio of Cu:Rh is $(100-a_7):a_7$ (where $a_7$ indicates atomic %), respectively, that the composition range should preferably be $7 \leq a_7 \leq 20$.

Corrosion tests were conducted on the spin-valve film 40 using an electrochemical method to measure changes in resistance after a corrosion test, and after the corrosion test, the surface was observed for occurrences of corrosion.

In the corrosion test, a standard hydrogen electrode (SHE) was used as a reference electrode, and the corrosion potential relative to the standard hydrogen electrode while immersed in a NaCl solution of a concentration of 0.1 mol/L was measured.

The corrosion potential will vary depending on the type or concentration of the solution used. In particular, the corrosion potential of metals or alloys will change substantially depending on whether a reaction with Cl takes place or not. Therefore, the corrosion test presently described focuses on occurrences of corrosion under harsh conditions such as high temperature and humidity conditions, seawater atmosphere or the like. For this reason, the corrosion potential in a NaCl solution of a concentration of 0.1 mol/L was measured.

Figure 6:
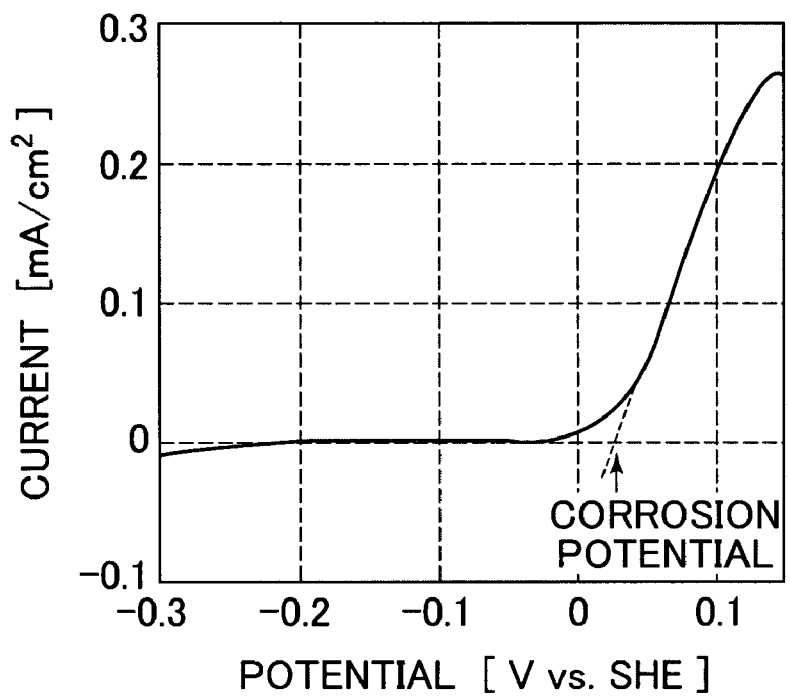
FIG. 6 is an explanatory chart of the definition of corrosion potential.

With reference to a polarization curve shown in FIG. 6, which was obtained using a predetermined sample, a potential value extrapolated from the polarization curve where the current density in the sample electrode is 0.1 mA/cm$^2$ or more is herein defined as the corrosion potential (Reference: "Physical properties of spin-valve materials" by Satoru Oikawa et al., The Institute of Electronics, Information and Communication Engineers, MR96-91 (1997–01) pp. 21–28).

Further, in this corrosion test, Ag/AgCl was used for the reference electrode, and Pt was used for a measuring electrode. Measurements of corrosion potential were taken at room temperature (approximately 20° C.). Then, a measured corrosion potential was compensated with respect to the standard hydrogen electrode (SHE), and the corrected value was taken to be the corrosion potential in this corrosion test. The rising rate of the potential during measurements is approximately 0.5 mV/s. The thickness of the sample was approximately 100 nm, and the pH value of the NaCl solution was 7.

In addition, the corrosion potential and the change in resistance after the corrosion test may be measured by any one of the following methods: taking measurements of each single film of the respective layers constituting the spin-valve film 40 in order to examine their film characteristics; taking measurements of the layered films which constitute the main portion of the spin-valve 40, in which the pinned layer 43 and the free layer 45 are layered with the non-magnetic layer 44 in between, in order to examine the compatibility of the films taking local cell effects into consideration; and taking measurements of the layered films in which the respective layers constituting the spin-valve film 40 are layered.

Further, in observing the surface, tests were performed on single layer films as described above, as well as on layered films in which the respective layers were layered on a foundation film of a metal having a high corrosion potential such as Au in consideration of local cell effects. This is because layered films in contact with Au tend to corrode more readily than single films due to local cell effects.

Figure 7:
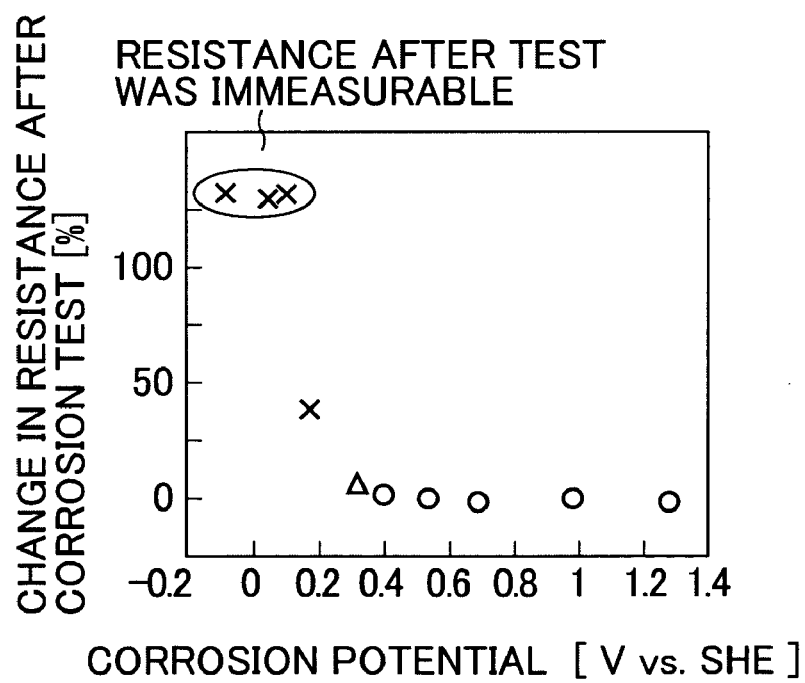
FIG. 7 shows the relationship between corrosion potential and the rate of change in resistance after a corrosion test, and the results of observing the surface.

A plurality of samples of the spin-valve film 40 were prepared and tested. The relationship between the corrosion potential and changes in resistance after the corrosion test thus measured as well as the results from observing the surface are shown in FIG. 7. In FIG. 7, a circle indicates that there were no changes on the surface, a triangle indicates that a slight change in color occurred on the surface, and a cross indicates that corrosion occurred on the surface.

As indicated in FIG. 7, from the measurements of the changes in resistance after the corrosion test and the results from observing the surface, it can be seen that there is a drastic change around the point where the corrosion potential is +0.4 [V vs. SHE]. In other words, when the corrosion potential is larger than +0.4 [V vs. SHE], no corrosion was identified on the surface of the spin-valve film 40, and almost no change in resistance was found after the corrosion test.

On the other hand, when the corrosion potential is smaller than +0.4 [V vs. SHE], corrosion occurred on the surface of the spin-valve film 40, and the change in resistance after the corrosion test increased rapidly. When the corrosion potential decreased further, corrosion progressed to an extent where it was impossible to measure the resistance.

From the description above, in the spin-valve film 40, it is preferable for the corrosion potential relative to the standard hydrogen electrode when measured while immersed in a NaCl solution of a concentration of 0.1 mol/L to be +0.4 [V vs. SHE] or above. As a result, in the GMR head, the occurrence of corrosion in the spin-valve film can be prevented, and a high MR ratio can be maintained.

Next, the relationship between the material composition ratio and corrosion potential was examined with respect to cases where the non-magnetic layer 44 constituting part of the spin-valve film was formed using any one of Au, CuAu, CuPd, CuPt, CuRu, CuNi and CuRh.

<A Case Where the Non-Magnetic Layer is Formed Using Au or CuAu>

Figure 8:
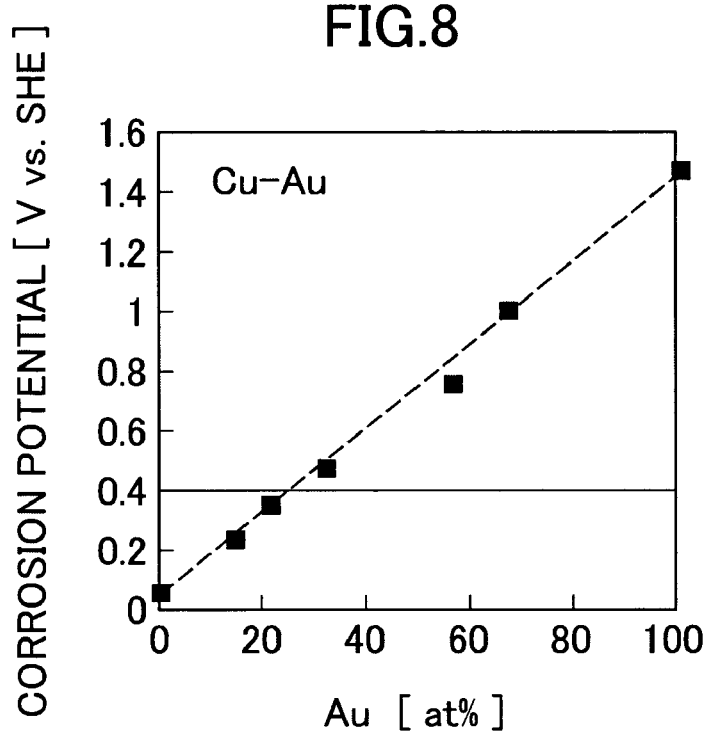
FIG. 8 shows the relationship between composition ratio and corrosion potential relative to a standard hydrogen electrode when the non-magnetic layer is made of Au, CuAu.

Measurements of the corrosion potential [V vs. SHE] of the non-magnetic layer 44 relative to the standard hydrogen electrode are shown in FIG. 8 with the amount of Au added to Cu varied.

As shown in FIG. 8, the relationship between the Cu:Au ratio and the corrosion potential was substantially proportional, and as the amount of Au added to Cu increased, the corrosion potential became higher. It was found that, by making the amount of Au added be 25 atomic % or greater, the corrosion potential relative to the standard hydrogen electrode became +0.4 [V vs. SHE] or greater.

Figure 9:
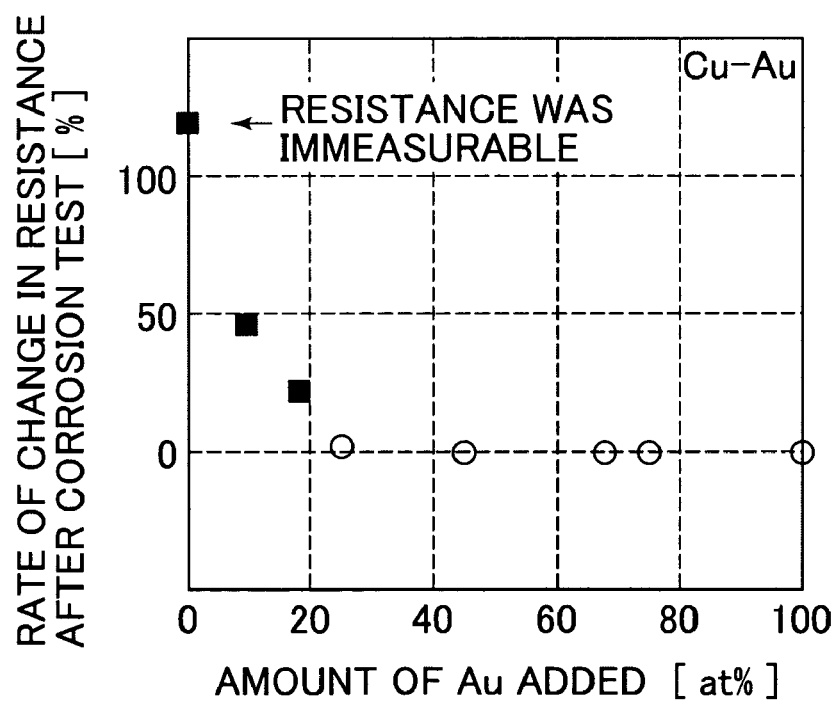
FIG. 9 shows the relationship between composition ratio and the rate of change in resistance after a corrosion test, and the results of observing the surface when the non-magnetic layer is made of CuAu.

Next, the change in resistance of the non-magnetic layer 44 after the corrosion test described above and the results of observing the surface are shown in FIG. 9 with respect to a case where the non-magnetic layer 44 was formed using CuAu.

In FIG. 9, a circle indicates that no corrosion was confirmed on the surface, and a solid square indicates corrosion was confirmed on the surface.

As shown in FIG. 9, when the non-magnetic layer 44 was formed using CuAu, it was found from the measurements of the change in resistance after the corrosion test as well as the results from observing the surface that by making the amount of Au added be 25 atomic % or greater, corrosion did not occur, and excellent corrosion resistance could be obtained.

When the non-magnetic layer 44 was formed using CuAu, the magnetoresistivity ratio became higher the lower the amount of AU added was.

Thus, assuming the composition ratio of Cu:Au is (100-$a_1$):$a_1$ (where $a_1$ indicates atomic %), respectively, it is preferable that the composition range be $25 \leq a_1 \leq 100$, more preferably $25 \leq a_1 \leq 75$, and still further preferably $25 \leq a_1 \leq 45$. Hence, even in a case where no protection film is formed on the medium sliding surface 20$a$ of the GMR head 20, it is possible to prevent occurrences of corrosion in the non-magnetic layer 44, and to obtain excellent corrosion resistance and excellent magnetoresistive effects.

<A Case Where the Non-Magnetic Layer is Formed Using CuPd>

Figure 10:
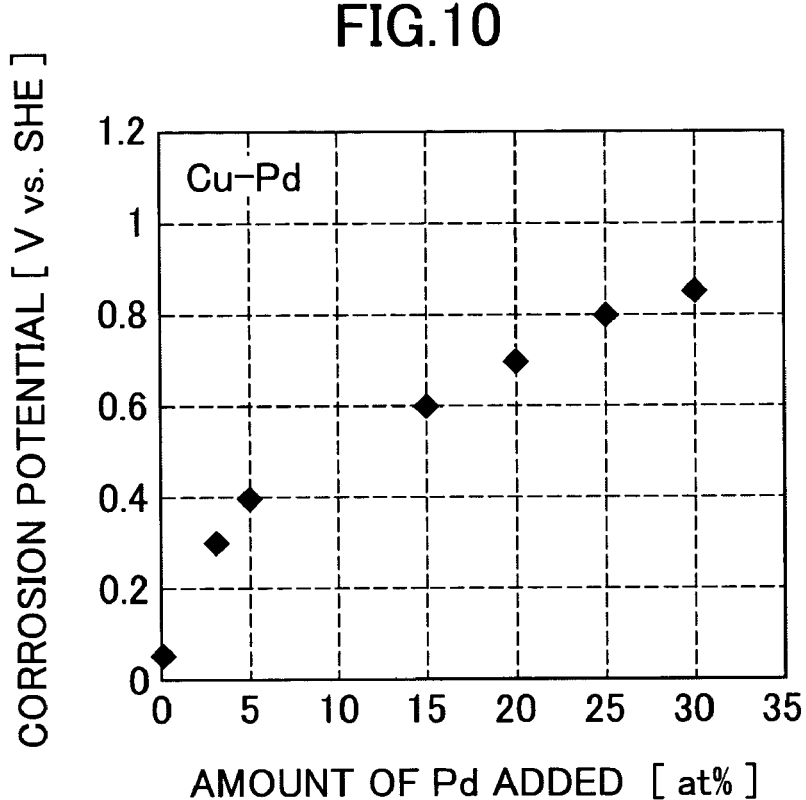
FIG. 10 shows the relationship between composition ratio and corrosion potential relative to a standard hydrogen electrode when the non-magnetic layer is made of CuPd.

Measurements of the corrosion potentials [V vs. SHE] of the non-magnetic layer 44 relative to the standard hydrogen electrode are shown in FIG. 10 with the amount of Pd added to Cu varied.

As shown in FIG. 10, the relationship between the amount of Pd added with respect to Cu and the corrosion potential was substantially proportional, and by making the amount of Pd added be 25 atomic % or greater, the corrosion potential relative to the standard hydrogen electrode became +0.4 [V vs. SHE] or greater.

Figure 11:
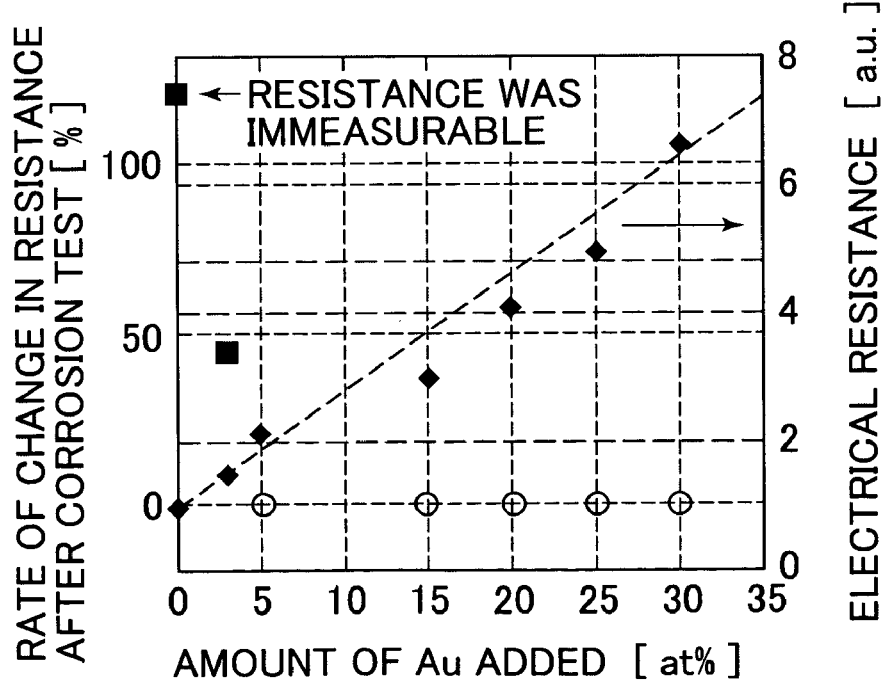
FIG. 11 is a characteristic chart in which the composition ratio, the rate of change in resistance after a corrosion test, the result of observing the surface and measurements of electrical resistance are plotted for a non-magnetic layer formed of CuPd.

Next, the rate of change in resistance of the non-magnetic layer 44 after the corrosion test described above and the results of observing the surface as well as the electrical resistance are shown in FIG. 11 with respect to a case where the non-magnetic layer 44 was formed using CuPd.

In FIG. 11, a circle indicates that no corrosion occurred on the surface, and a solid square indicates corrosion did occur on the surface.

As shown in FIG. 11, when the non-magnetic layer 44 is formed using CuPd, it was found from the measurements of the change in resistance after the corrosion test as well as the results from observing the surface that by making the amount of Pd added be 5 atomic % or greater, corrosion did not occur, and excellent corrosion resistance could be obtained.

As indicated by solid diamonds in FIG. 11, it can be seen that the electrical resistance of CuPd increases with the increase in the amount of Pd added. When the amount of Pd added exceeds 25 atomic %, the electrical resistance of the non-magnetic layer 44 increases to an extent that it interferes with practical use of the spin-valve film and the magnetoresistive effects are lowered. Thus, in order to reduce the electrical resistance to a value suitable for practical use, it is preferable that the amount of Pd added be 25 atomic % or below. It is further preferable that it be approximately 20 atomic % or below.

From the description above, when the non-magnetic layer 44 is formed of CuPd, assuming that the composition ratio of Cu:Pd is $(100-a_3):a_3$ (where $a_3$ indicates atomic %), respectively, it is preferable that the composition range be $5 \leq a_3 \leq 25$.

<A Case Where the Non-Magnetic Layer is Formed Using CuPt>

Figure 12:
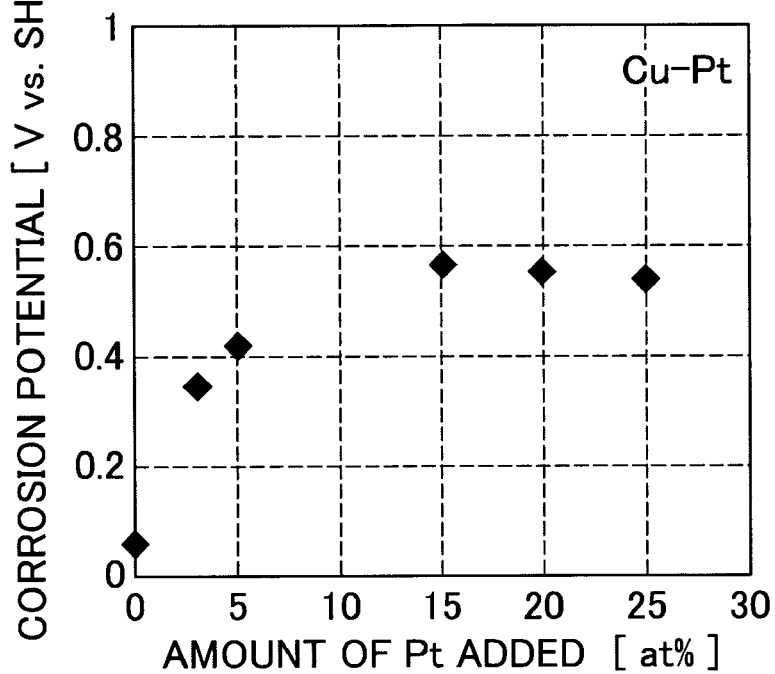
FIG. 12 shows the relationship between composition ratio and corrosion potential relative to a standard hydrogen electrode when the non-magnetic layer is formed of CuPt.

Measurements of the corrosion potential of the non-magnetic layer 44 relative to the standard hydrogen electrode [V vs. SHE] are shown in FIG. 12 with the amount of Pt added to Cu varied.

As shown in FIG. 12, by making the amount of Pt added with respect to Cu be 5 atomic % or greater, the corrosion potential relative to the standard hydrogen electrode became +0.4 [V vs. SHE] or greater.

Figure 13:
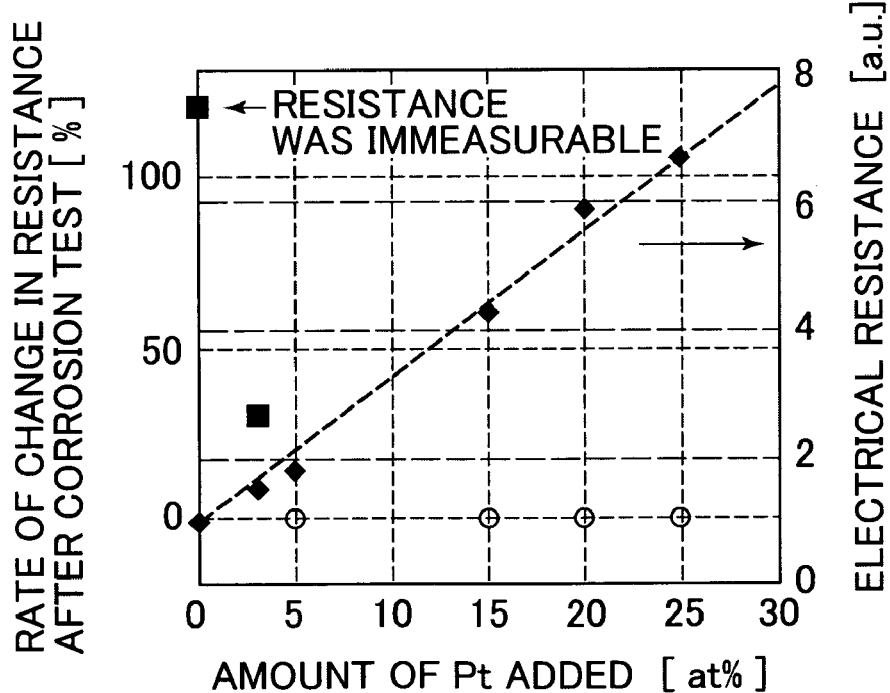
FIG. 13 is a characteristic chart in which composition ratio, the rate of change in resistance after a corrosion test, the results of observing the surface and measurements of electrical resistance are plotted for a non-magnetic layer formed of CuPt.

Next, the change in resistance of the non-magnetic layer 44 after the corrosion test described above and the results of observing the surface, as well as the electrical resistance are shown in FIG. 13 with respect to a case where the non-magnetic layer 44 was formed using CuPt.

In FIG. 13, a circle indicates that no change occurred on the surface, and a solid square indicates that corrosion occurred on the surface. Electrical resistance is expressed as a ratio in relation to Cu.

As shown in FIG. 13, when the non-magnetic layer 44 is formed using CuPt, it was found from the measurements of the change in resistance after the corrosion test as well as the results from observing the surface that by making the amount of Pt added be 5 atomic % or greater, corrosion did not occur, and excellent corrosion resistance could be obtained.

In the spin-valve film 40, there must be exchange-coupling between the anti-ferromagnetic layer 42 and the pinned layer 43. Therefore, when PtMn is used for the anti-ferromagnetic layer 42, annealing for a transformation of an antimagnetic layer is required.

When the non-magnetic layer 44 is formed using CuPt, if 20 atomic % of Pt or more is added, CuPt is caused to transform from a cubic system to a tetragonal system through the annealing for a transformation of an antimagnetic layer described above.

Further, as indicated by solid diamonds in FIG. 13, the electrical resistance of CuPt was found to increase with the amount of Pt added. When the amount of Pt added exceeded 20 atomic %, the electrical resistance of the non-magnetic layer 44 increased to an extent that it interfered with practical use of the spin-valve film and the magnetoresistive effects were lowered. Thus, in order to reduce the electrical resistance to a value suitable for practical use, it is preferable that the amount of Pt added be 20 atomic % or below. It is further preferable that it be approximately 15 atomic % or below.

From the description above, when the non-magnetic layer 44 is formed of CuPt, assuming that the composition ratio of Cu:Pt is $(100-a_4):a_4$ (where $a_4$ indicates atomic %), respectively, it is preferable that the composition range be $5 \leq a_4 \leq 20$.

<A Case Where the Non-Magnetic Layer is Formed Using CuRu>

Figure 14:
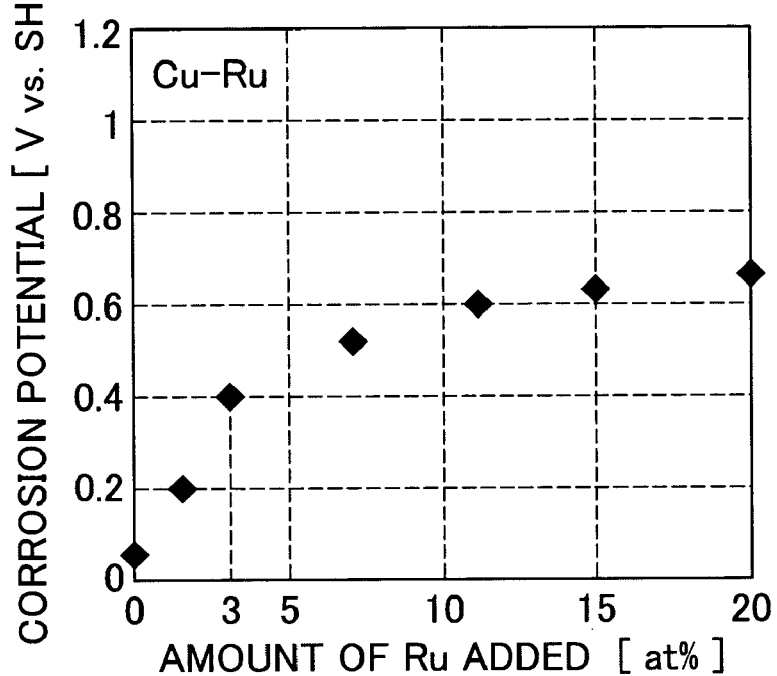
FIG. 14 shows the relationship between composition ratio and corrosion potential relative to a standard hydrogen electrode when the non-magnetic layer is formed of CuRu.

Measurements of the corrosion potential of the non-magnetic layer 44 relative to the standard hydrogen electrode [V vs. SHE] are shown in FIG. 14 with the amount of Ru added to Cu varied.

As shown in FIG. 14, the relationship was such that as the amount of Ru added with respect to Cu increased, the corrosion potential became greater. It was found that, by making the amount of Ru added be 3 atomic % or greater, the corrosion potential relative to the standard hydrogen electrode mentioned above became +0.4 [V vs. SHE] or greater.

Figure 15:
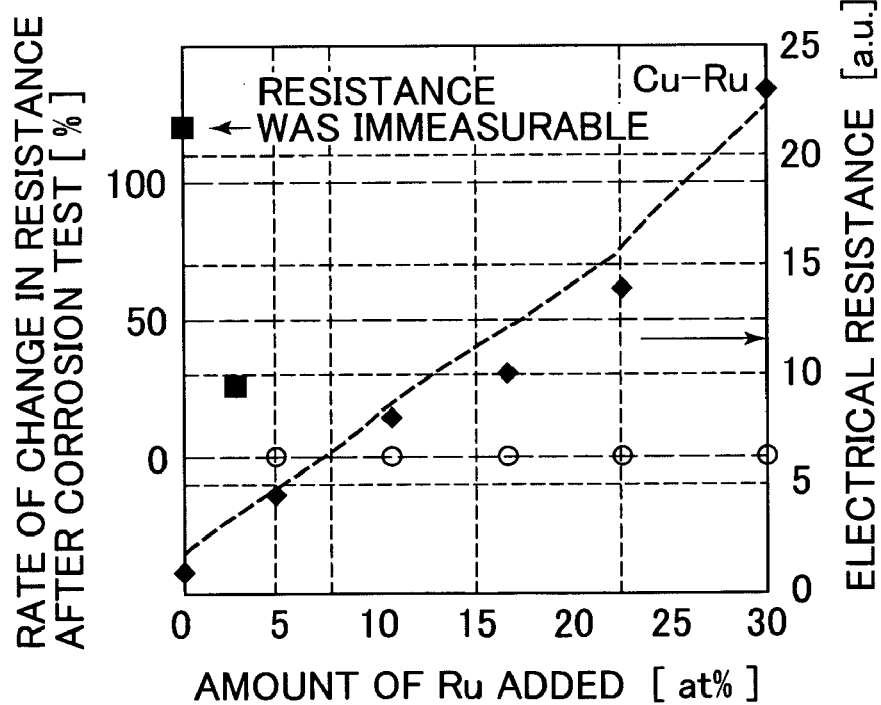
FIG. 15 is a characteristic chart in which the composition ratio, the rate of change in resistance after a corrosion test, the results of observing the surface and measurements of electrical resistance are plotted for a non-magnetic layer formed of CuRu.

Next, the rate of change in resistance of the non-magnetic layer 44 after the corrosion test described above and the results of observing the surface as well as the electrical resistance are shown in FIG. 15 with respect to a case where the non-magnetic layer 44 was formed using CuRu.

In FIG. 15, a circle indicates that no change occurred on the surface, and a solid square indicates that corrosion did occur on the surface.

As shown in FIG. 15, when the non-magnetic layer 44 was formed using CuRu, it was found from the measurements of the change in resistance after the corrosion test as well as the results from observing the surface that by making the amount of Ru added be 3 atomic % or greater, corrosion did not occur, and excellent corrosion resistance could be obtained.

Further, as indicated by solid diamonds in FIG. 15, the electrical resistance of CuRu increased as the amount of Ru added increased.

When the amount of Ru added exceeded 15 atomic %, the electrical resistance of the non-magnetic layer 44 increased to an extent that it interfered with practical use of the spin-valve film and the magnetoresistive effects were lowered. Thus, in order to reduce the electrical resistance to a value suitable for practical use, it is preferable that the amount of Ru added be 15 atomic % or below. It is further preferable that it be approximately 10 atomic % or below.

From the description above, when the non-magnetic layer 44 is formed of CuRu, assuming that the composition ratio of Cu:Ru is $(100-a_5):a_5$ (where as indicates atomic %), respectively, it is preferable that the composition range be $5 \leq a_5 \leq 25$.

<A Case Where the Non-Magnetic Layer is Formed Using CuNi>

Figure 16:
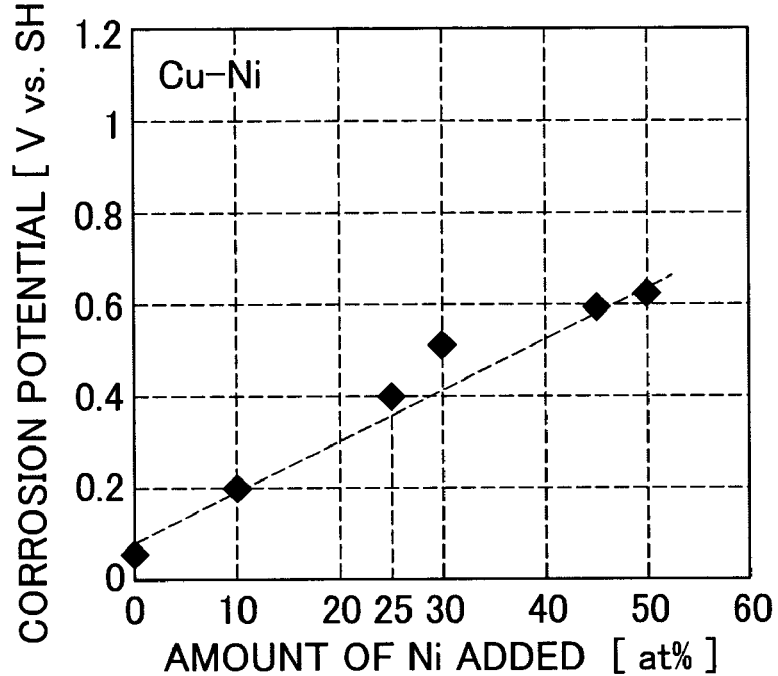
FIG. 16 shows the relationship between composition ratio and corrosion potential relative to a standard hydrogen electrode when the non-magnetic layer is formed of CuNi.

Measurements of the corrosion potential of the non-magnetic layer 44 relative to the standard hydrogen electrode [V vs. SHE] are shown in FIG. 16 with the amount of Ni added to Cu varied.

The relationship between the amount of Ni added with respect to Cu and the corrosion potential was approximately proportional as shown in FIG. 16, and by making the amount of Ni added be 25 atomic % or greater, the corrosion potential relative to the standard hydrogen electrode became +0.4 (V vs. SHE) or greater.

Figure 17:
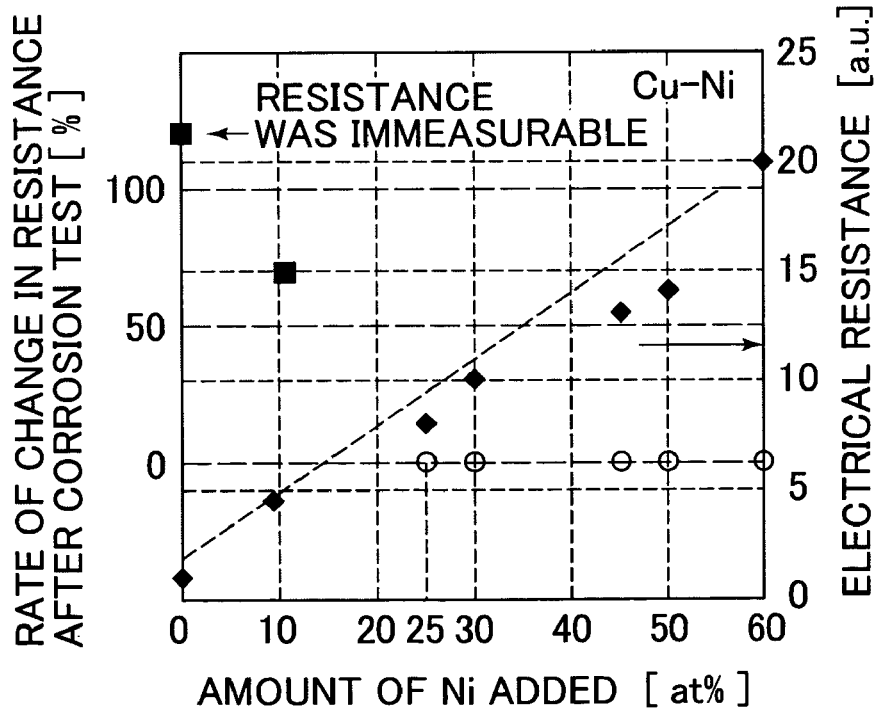
FIG. 17 is a characteristic chart in which the composition ratio, the rate of change in resistance after a corrosion test, the results of observing the surface and measurements of electrical resistance are plotted for a non-magnetic layer formed of CuNi.

Next, the rate of change in resistance of the non-magnetic layer 44 after the corrosion test described above and the results of observing the surface as well as the electrical resistance are shown in FIG. 17 with respect to a case where the non-magnetic layer 44 was formed using CuNi.

In FIG. 17, a circle indicates that no change occurred on the surface, and a solid square indicates that corrosion did occur on the surface. The electrical resistance of the non-magnetic layer 44 is expressed numerically in comparison with a case where the non-magnetic layer 44 was formed using Cu.

As shown in FIG. 17, when the non-magnetic layer 44 is formed using CuNi, it was found from the measurements of the change in resistance after the corrosion test as well as the results from observing the surface that by making the amount of Ni added be 25 atomic % or greater, corrosion did not occur, and excellent corrosion resistance could be obtained.

Further, as indicated by solid diamonds in FIG. 17, the electrical resistance of CuNi increased as the amount of Ni added increased.

When the amount of Ni added exceeded 50 atomic %, the electrical resistance of the non-magnetic layer 44 increased to an extent that it interfered with practical use of the spin-valve film and the magnetoresistive effects were lowered. Thus, in order to reduce the electrical resistance to a value suitable for practical use, it is preferable that the amount of Ni added be 50 atomic % or below. It is further preferable that it be approximately 45 atomic % or below.

From the description above, when the non-magnetic layer 44 is formed of CuNi, assuming that the composition ratio of Cu:Ni is (100-$a_6$):$a_6$ (where $a_6$ indicates atomic %), respectively, it is preferable that the composition range be $25 \leq a_6 \leq 50$.

<A Case Where the Non-Magnetic Layer is Formed Using CuRh>

Measurements of the corrosion potential of the non-magnetic layer 44 relative to the standard hydrogen electrode [V vs. SHE] are shown in FIG. 16 with the amount of Ni added varied.

Figure 18:
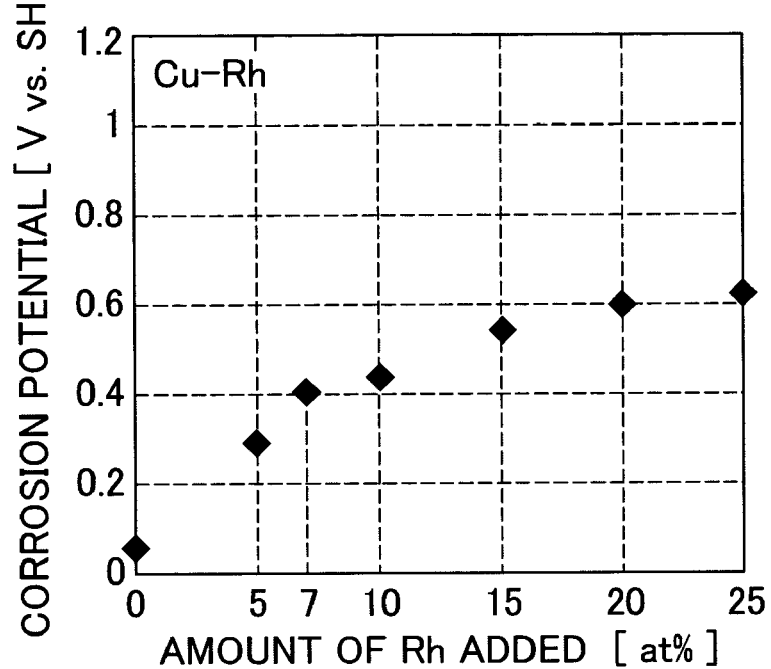
FIG. 18 shows the relationship between composition ratio and corrosion potential relative to a standard hydrogen electrode when the non-magnetic layer is formed of CuRh.

As shown in FIG. 18, by making the amount of Rh added be 7 atomic % or greater, the potential relative to the standard hydrogen electrode became +0.4 (V vs. SHE) or greater.

Figure 19:
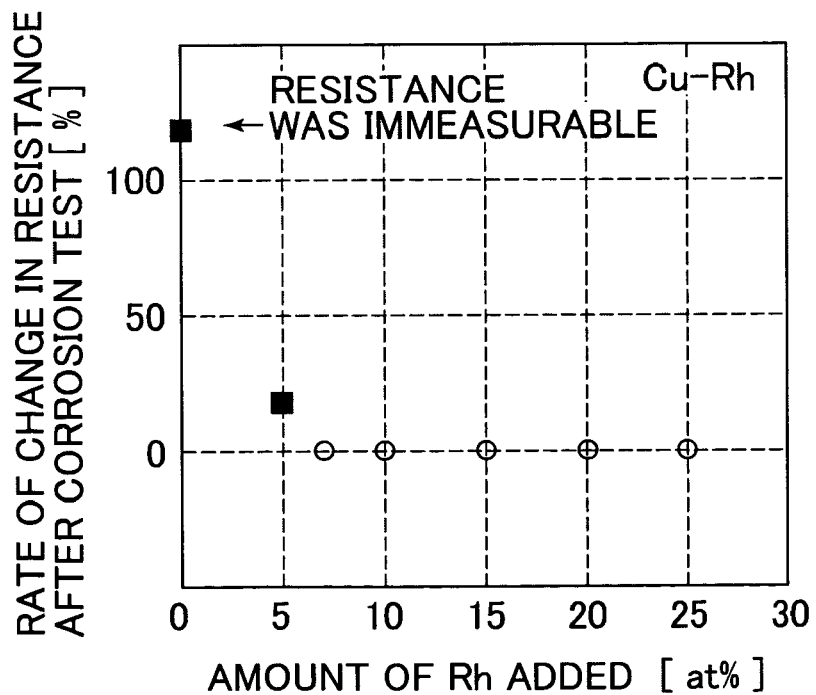
FIG. 19 is a characteristic chart in which the composition ratio, the rate of change in resistance after a corrosion test and the results of observing the surface are plotted for a non-magnetic layer formed of CuRh.
Figure 20:
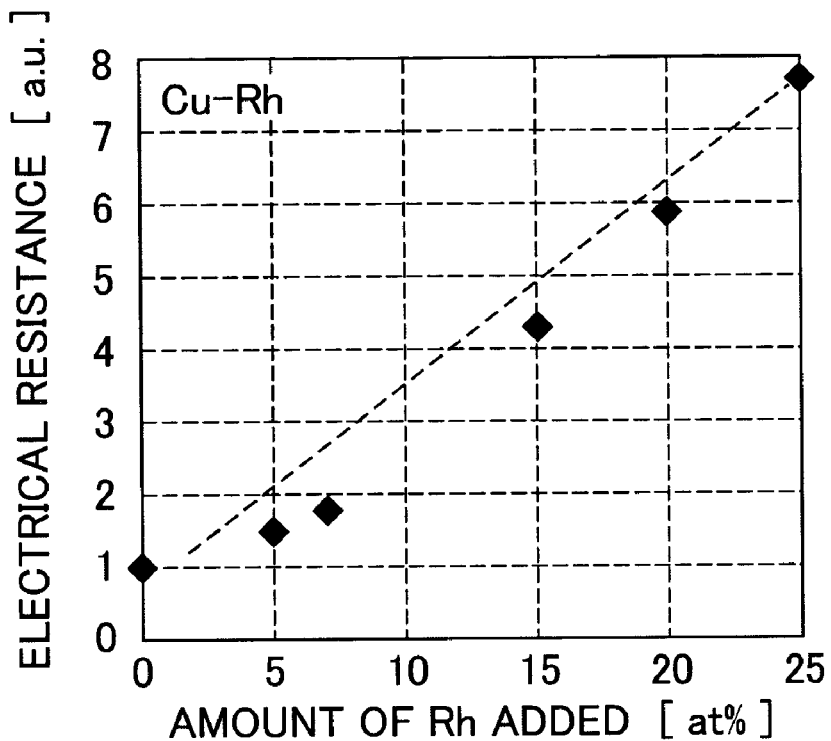
FIG. 20 shows a characteristic chart in which composition ratio and electrical resistance are plotted for a non-magnetic layer formed of CuRh.

Next, with respect to a case where the non-magnetic layer 44 was formed using CuRh, the rate of change in resistance of the non-magnetic layer 44 after the corrosion test described above and the results of observing the surface are shown in FIG. 19, and the amount of Rh added and the electrical resistance before and after the corrosion test are shown in FIG. 20.

In FIG. 19, a circle indicates that no change occurred on the surface, and a solid square indicates that corrosion did occur on the surface. The electrical resistance in FIG. 20 is expressed in relation to Cu.

As shown in FIG. 19, when the non-magnetic layer 44 was formed using CuRh, it was found from the measurements of the change in resistance after the corrosion test as well as the results from observing the surface that by making the amount of Rh added be 7 atomic % or greater, corrosion did not occur, and excellent corrosion resistance could be obtained.

Further, as indicated by solid diamonds in FIG. 20, the electrical resistance of CuRh increased as the amount of Rh added increased. When the amount of Rh added exceeded 20 atomic %, the electrical resistance of the non-magnetic layer 44 increased to an extent that it interfered with practical use of the spin-valve film and the magnetoresistive effects were lowered. Thus, in order to reduce the electrical resistance to a value suitable for practical use, it is preferable that the amount of Rh added be 20 atomic % or below.

From the description above, when the non-magnetic layer 44 is formed of CuRh, assuming that the composition ratio of Cu:Rh is (100-$a_7$):$a_7$ (where $a_7$ indicates atomic %), respectively, it is preferable that the composition range be $7 \leq a_7 \leq 20$.

In addition, the non-magnetic layer 44 described above may contain one or more elements arbitrarily selected from Au, Al, Ta, In, B, Nb, Hf, Mo, W, Re, Pt, Pd, Rh, Ga, Zr, Ir, Ag, Ni and Ru.

Next, the pinned layer 43 and the free layer 45 constituting the spin-valve film 40 will be described.

NiFe or CoNiFe, which exhibit excellent corrosion resistance and soft magnetic characteristics are used for the pinned layer 43 and the free layer 45. They may be used alone or in combination. Further, the pinned layer 43 and the free layer 45 may have a layered structure in which these alloys are layered or a synthetic ferrimagnetic structure in which these alloys and a non-magnetic film made of, for example, Ru or the like are layered alternately.

For the pinned layer 43 and the free layer 45, a plurality of samples made of NiFe or CoNiFe alloys, in which the composition ratio of Co:Ni:Fe was varied, were prepared. Then, for each sample, the corrosion potential was measured using a NaCl solution with a concentration of 0.1 mol/L in the same manner as described above, and the surface was observed after the corrosion test to check for occurrences of corrosion.

Figure 21:
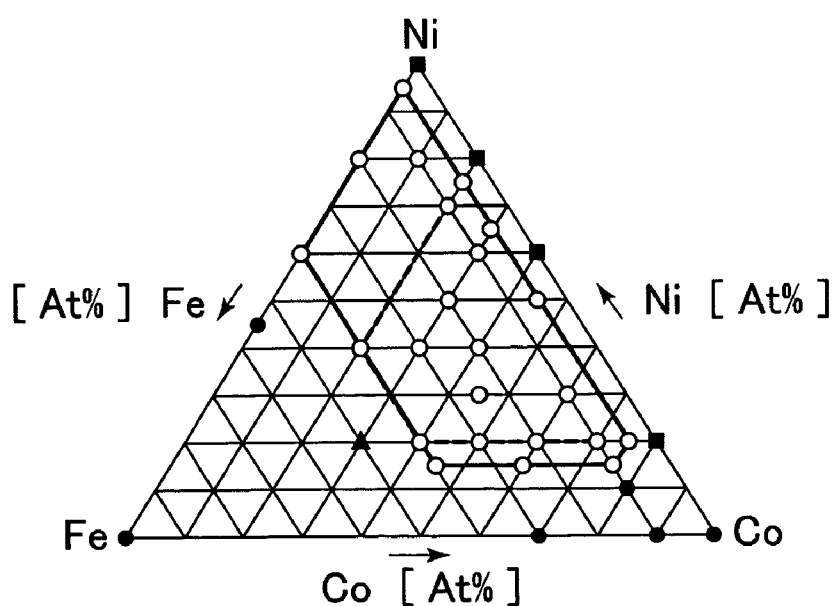
FIG. 21 shows the results of a corrosion test of a pinned layer and a free layer where the composition ratio is varied.

In FIG. 21, the evaluation results of the corrosion test, where the composition ratio of Co:Ni:Fe was varied, is shown. In FIG. 21, a circle indicates that there was no surface corrosion, and that the corrosion potential relative to the standard hydrogen electrode measured while immersed in a NaCl solution of a concentration of 0.1 mol/L became +0.4 [V vs. SHE] or greater, and a solid circle indicates that surface corrosion occurred.

Further, a solid square indicates that the coercive force Hc became larger than 10 Oe (796 A/m), and a solid triangle indicates a transition to the bcc phase (body centered cubic structure). If Hc>10 Oe, the magnetoresistive effects deteriorate due to the increase in coercive force.

Further, as to NiFe or CoNiFe, their magnetoresistive effects are higher in the fcc phase (face centered cubic structure). On the other hand, when they take on other crystalline structures, the magnetoresistive effects thereof deteriorate due to a lattice mismatch at the interface. Also, when both the fcc phase and the bcc phase coexist, the magnetoresistive effects deteriorate due to occurrences of a lattice mismatch at the interface.

As shown in FIG. 21, it was found that when the amount of Co or Ni contained was larger than 75 atomic % or smaller than 15 atomic %, respectively, in relation to Co, Ni and Fe, corrosion tended to occur more easily in the pinned layer 43 as well as in the free layer 45. Further, when the amount of Ni or Fe contained was larger than 95 atomic % or smaller than 5 atomic %, respectively, in relation to Co, Ni and Fe, it was found that the coercive force Hc of the pinned layer 43 and the free layer 45 became greater, and the magnetoresistive effects deteriorated.

Still further, when the amount of Fe contained became larger than 40 atomic % in relation to Co, Ni and Fe, it was found that corrosion tended to occur more easily in the pinned layer 43 as well as in the free layer 45.

As can be seen from the description above, if the non-magnetic layer is formed using one of Au, CuAu, CuPd, CuPt, CuNi, CuRu and CuRh, and if the pinned layer 43 as well as the free layer 45 are formed using FeNi or CoNiFe, assuming the composition ratio of Co:Ni:Fe is b:c:d (where b, c and d represent atomic %), their composition ranges should preferably be $0 \leq b \leq 75$, $15 \leq c \leq 95$, $5 \leq d \leq 40$ (where b+c+d=100 atomic %).

Figure 22:
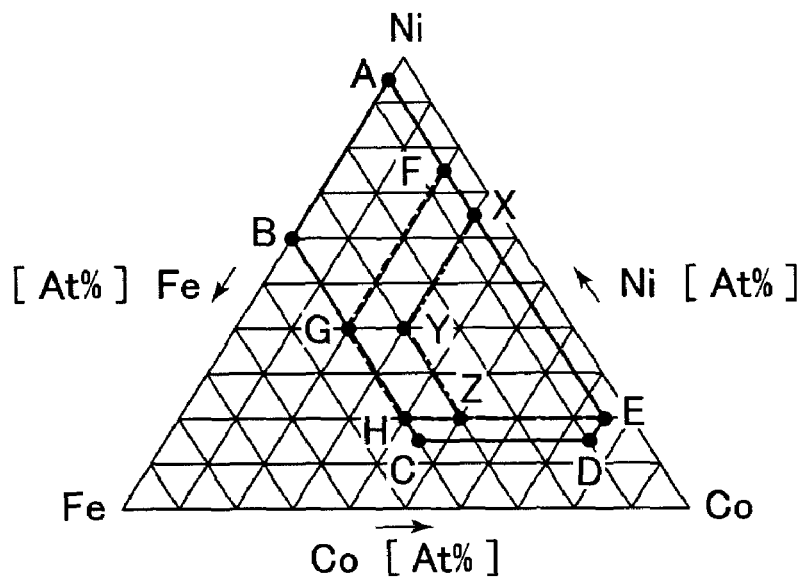
FIG. 22 shows composition ranges suitable for effectively preventing corrosion with respect to a pinned layer and a free layer.

In other words, in the pinned layer 43 and the free layer 45, as shown in FIG. 22, the composition ratio of Co:Ni:Fe should preferably be kept within the range enclosed by solid lines defined by points A (Co=0 atomic %, Ni=95 atomic %, Fe=5 atomic %), B (Co=0 atomic %, Ni=60 atomic %, Fe=40 atomic %), C (Co=45 atomic %, Ni=15 atomic %, Fe= 40 atomic %), D (Co=75 atomic %, Ni=15 atomic %, Fe=10 atomic %), and E (Co=75 atomic %, Ni=20 atomic %, Fe=5 atomic %). By selecting such a composition ratio, even if no protection film is formed on the medium sliding surface 20a that contacts the magnetic tape 2, occurrences of corrosion in the pinned layer 43 as well as in the free layer 45 constituting part of the spin-valve film can be prevented.

In the pinned layer 43 and the free layer 45, it is further preferable that the composition ranges of Co, Ni and Fe be such that $20 \leq b \leq 75$, $20 \leq c \leq 75$, and $5 \leq d \leq 40$. In other words, it is further preferable that the composition ratio of Co:Ni:Fe fall within the area enclosed by the broken lines in FIG. 22 defined by points F (Co=20 atomic %, Ni=75 atomic % and Fe=5 atomic %), G (Co=20 atomic %, Ni=40 atomic % and Fe=40 atomic %), H (Co=40 atomic %, Ni=20 atomic % and Fe=40 atomic %) and E (Co=75 atomic %, Ni=20 atomic % and Fe=5 atomic %).

Thus, in the magnetoresistive head 20 according to an embodiment of the present invention, the pinned layer 43 and the free layer 45 may exhibit excellent corrosion resistance and may be capable of maintaining a high magnetoresistivity ratio, and at the same time may be able to improve the MR ratio by increasing, in particular, the ratio of Co.

Further, by making the composition ranges of Co, Ni and Fe in the pinned layer 43 and the free layer 45, be $40 \leq b \leq 75$, $20 \leq c \leq 65$, $5 \leq d \leq 30$, that is, by keeping the composition ratio of Co:Ni:Fe within the area enclosed by points X (Co=30 atomic %, Ni=65 atomic % and Fe=5 atomic %), Y (Co=30 atomic %, Ni=40 atomic % and Fe=30 atomic %), Z (Co=50 atomic %, Ni=20 atomic % and Fe=30 atomic %) and E (Co=75 atomic %, Ni=20 atomic % and Fe=5 atomic %) shown in FIG. 22, the pinned layer 43 and the free layer 45 may exhibit good corrosion resistance and may be able to maintain a high magnetoresistivity ratio, and at the same time balance good corrosion resistance and a high magnetoresistivity ratio at a high order.

In addition, in the spin-valve film 40 described above, the pinned layer 43 and the free layer 45 may further contain at least one or more elements selected from Au, Ir, Pt, Al, Rh, Cr, Pd and Ru in addition to NiFe or CoNiFe alloys having the composition ratio described above.

Magnetostriction of the pinned layer 43 and the free layer 45 in the spin-valve film 40 will be described next. When magnetostriction in the pinned layer 43 and the free layer 45 is large, and in particular, when it is large in the positive direction, it may cause noise in the GMR head 20. This is because a small internal stress is exerted on the spin-valve film 40, and therefore, if magnetostriction is higher than $+1.0 \times 10^{-5}$, magnetization occurs to form magnetic domains within the pinned layer 43 and the free layer 45 so as to the distort single magnetic domain structure of the pinned layer 43 and the free layer 45, thereby causing noise in the GMR head 20.

Figure 23:
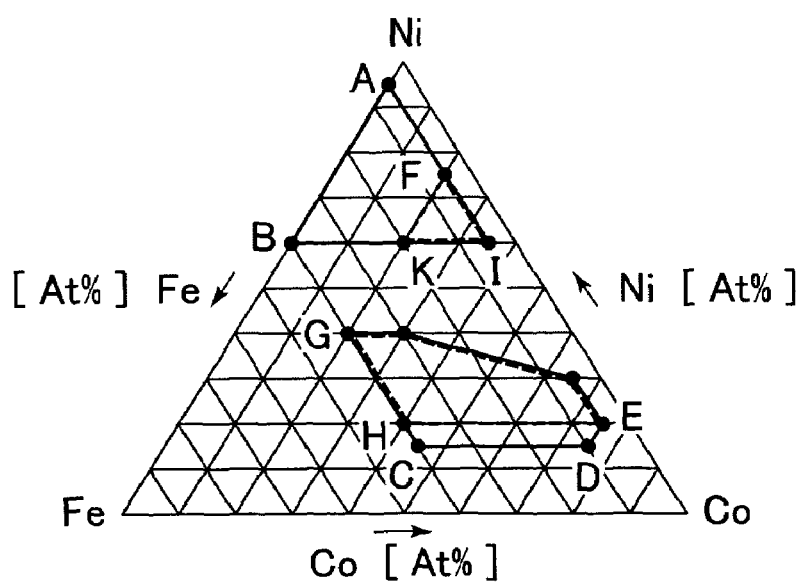
FIG. 23 shows composition ranges suitable for improving corrosion resistance and magnetoresistivity ratio, and for reducing noise with respect to a pinned layer and a free layer.

Of the CoNiFe alloy shown in FIG. 22 having high corrosion resistance, if the composition ranges of Co, Ni and Fe are such that $0 \leq b \leq 35$, $60 \leq c \leq 95$ and $5 \leq d \leq 40$, in other words, if the composition ratio of Co:Ni:Fe is kept within the area enclosed by points A (Co=0 atomic %, Ni= 95 atomic % and Fe=5 atomic %), B (Co=0 atomic %, Ni=60 atomic % and Fe=40 atomic %) and I (Co=35 atomic %, Ni=60 atomic % and Fe=5 atomic %) in FIG. 23, or if the composition ranges of Co, Ni and Fe are such that $20 \leq b \leq 75$, $15 \leq c \leq 40$ and $5 \leq d \leq 40$, in other words, if the composition ratio of Co:Ni:Fe is kept within the area enclosed by solid lines in FIG. 23 defined by points C (Co=45 atomic %, Ni=15 atomic % and Fe=40 atomic %), D (Co=75 atomic %, Ni=15 atomic % and Fe=10 atomic %), E (Co=75 atomic %, Ni=20 atomic % and Fe=5 atomic %), J (Co=65 atomic %, Ni=30 atomic % and Fe=5 atomic %) and G (Co=20 atomic %, Ni=40 atomic % and Fe=40 atomic %), magnetostriction becomes smaller than $+1.0 \times 10^{-5}$.

From the result on corrosion resistance and magnetostriction described above, it can be inferred that it is possible to obtain good corrosion resistance, reduce magnetostriction and noise if the composition ranges of Co, Ni and Fe are set such that $0 \leq b \leq 35$, $65 \leq c \leq 95$ and $5 \leq d \leq 40$, or $20 \leq b \leq 75$, $15 \leq c \leq 45$ and $5 \leq d \leq 40$.

Still further, if the composition ranges of Co, Ni and Fe are such that $20 \leq b \leq 35$, $60 \leq c \leq 75$ and $5 \leq d \leq 20$, or $20 \leq b \leq 75$, $15 \leq c \leq 40$ and $5 \leq d \leq 40$, in other words, if the composition ratio of Co:Ni:Fe is kept within the area enclosed by broken lines in FIG. 23 defined by points F (Co=20 atomic %, Ni=75 atomic %, Fe=5 atomic %), K (Co=20 atomic %, Ni=60 atomic %, Fe=20 atomic %) and I (Co=35 atomic %, Ni=60 atomic %, Fe= 5 atomic %), or within the area enclosed by broken lines in FIG. 23 defined by points H (Co=40 atomic %, Ni=20 atomic %, Fe=40 atomic %), E (Co=75 atomic %, Ni=20 atomic %, Fe=5 atomic %), J (Co= 65 atomic %, Ni=30 atomic %, Fe=5 atomic %) and G (Co=20 atomic %, Ni=40 atomic %, Fe=40 atomic %), corrosion resistance may be improved, a high magnetoresistivity may be obtained, and magnetostriction and noise may be reduced.

In addition, the pinned layer 43 and the free layer 45, which include NiFe or CoNiFe having the composition ratio described above, may differ from each other in their respective compositions in the spin-valve 40 or may be configured as a plurality of combinations.

It was confirmed that, by adopting, for a spin-valve film 40 that satisfies the various conditions described above, a configuration in which, for example, Ta as the foundation layer 41, $Ni_{80}Fe_{20}$ and $Co_{50}Ni_{30}Fe_{20}$ alloys as the free layer 45, a $Cu_{70}Au_{30}$ alloy as the non-magnetic layer, a $Co_{50}Ni_{30}Fe_{20}$ alloy as the pinned layer 43, PtMn as the anti-ferromagnetic layer 42, and Ta as the protection layer 46 are sequentially layered, good corrosion resistance was exhibited, and that even when no protection film is formed on the medium sliding surface 20a that contacts a magnetic tape, occurrences of corrosion under harsh conditions, such as, for example, high temperature and humidity conditions, seawater atmosphere and the like, could be prevented and appropriate reproduction of information from the magnetic tape 2 could be performed.

In particular, when this GMR head was applied to reproducing magnetic heads 12a and 12b in the magnetic tape apparatus 1 using the helical scan system, excellent corrosion resistance was obtained.

Further, when any material selected from Au, CuPd, CuPt, CuNi, CuRu and CuRh was used as the non-magnetic layer, as in the case described above, good corrosion resistance was exhibited, and occurrences of corrosion under harsh condition, such as high temperature and humidity conditions, seawater atmosphere and the like, was prevented even when no protection film was formed on the medium sliding surface 20a, and appropriate reproducing operations could be performed.

Although the present invention has been described in its preferred form with a certain degree of particularity as applied to the GMR head 20, it is by no means limited thereto, and it may be applied also to, for example, a combined magnetic head in which an inductive type magnetic head is provided on a GMR head.

Further, the present invention can be applied also to a tunneling magnetoresistive head equipped with a magnetic tunnel junction element which is formed by layering a pair of magnetic layers with an insulation layer in between, and in which the conductance of a tunnel current flowing from one of the pair of magnetic layers to the other changes depending on the relative angle of magnetization between the pair of magnetic layers.

Since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A magnetoresistive head, comprising:
    a spin-valve film as a magnetic sensor element for detecting magnetic signals while in contact with a magnetic recording medium, said spin-valve film having a structure in which an anti-ferromagnetic layer, a pinned layer in which the direction of magnetization is pinned in a predetermined direction by an exchange-coupling magnetic field at work between itself and said anti-ferromagnetic layer, a free layer in which the direction of magnetization changes in accordance with an external magnetic field, and a non-magnetic layer for magnetically isolating said pinned layer and said free layer are layered,
    wherein said spin-valve film has a corrosion potential relative to a standard hydrogen electrode of +0.4.[V vs. SHE] or greater when immersed in a NaCl solution of a concentration of 0.1 mol/L,
    wherein said non-magnetic layer comprises CuAu, and wherein the composition ratio of Cu:Au is $(100-a_1):a_1$ (where $a_1$, represents atomic %), respectively, the composition range thereof is such that $25 \leq a_1 < 100$, said pinned layer and said free layer comprise one of NiFe and CoNiFe, and wherein the composition ratio of Co:Ni:Fe is $b_1:c_1:d_1$ (where $b_1$, $c_1$ and $d_1$ represent atomic %), respectively, the composition ranges thereof are such that $0 \leq b_1 \leq 75$, $15 \leq c_1 \leq 95$ and $5 \leq d_1 \leq 40$ (where $b_1+c_1+d_1=100$ atomic %), and
    said magnetoresistive head detects magnetic signals while in contact with a tape-formed magnetic recording medium.

2. The magnetoresistive head according to claim 1, wherein said magnetic sensor element is mounted on a rotary drum and detects magnetic signals while contacting said tape-formed magnetic recording medium by a helical scan method.

3. A magnetoresistive head, comprising:
    a spin-valve film as a magnetic sensor element for detecting magnetic signals while in contact with a magnetic recording medium, said spin-valve film having a structure in which an anti-ferromagnetic layer, a pinned layer in which the direction of magnetization is pinned in a predetermined direction by an exchange-coupling magnetic field at work between itself and said anti-ferromagnetic layer, a free layer in which the direction of magnetization changes in accordance with an external magnetic field, and a non-magnetic layer for magnetically isolating said pinned layer and said free layer are layered.
    wherein in said spin-valve film, each of said anti-ferromagnetic layer, said pinned layer, said free layer and said non-magnetic layer has a corrosion potential relative to a standard hydrogen electrode of +0.4.[V vs. SHE] or greater when immersed in a NaCl solution of a concentration of 0.1 mol/L,
    wherein said non-magnetic layer comprises CuAu, and wherein the composition ratio of Cu:Au is $(100-a_1):a_1$ (where $a_1$ represents atomic %), respectively, the composition range thereof is such that $25 \leq a_1 \leq 100$,
    said pinned layer and said free layer comprise one of NiFe and CoNiFe, and wherein the composition ratio of Co:Ni:Fe is $b_1:c_1:d_1$ (where $b_1$, $c_1$ and $d_1$ represent atomic %), respectively, the composition ranges thereof are such that $0 \leq b_1 \leq 75$, $15 \leq c_1 \leq 95$ and $5 \leq d_1 \leq 40$ (where $b_1+c_1+d_1=100$ atomic %), and
    said magnetoresistive head detects magnetic signals while in contact with a tape-formed magnetic recording medium.

4. The magnetoresistive head according to claim 3, wherein said magnetic sensor element is mounted on a rotary drum and detects magnetic signals while contacting said tape-formed magnetic recording medium by a helical scan method.

5. A magnetoresistive head, comprising:
    a spin-valve film as a magnetic sensor element for detecting magnetic signals while in contact with a magnetic recording medium, said spin-valve film having a structure in which an anti-ferromagnetic layer, a pinned layer in which the direction of magnetization is pinned in a predetermined direction by an exchange-coupling magnetic field at work between itself and said anti-ferromagnetic layer, a free layer in which the direction of magnetization changes in accordance with an external magnetic field and a non-magnetic layer for magnetically isolating said pinned layer and said free layer are layered,
    wherein said spin-valve film has a corrosion potential relative to a standard hydrogen electrode of +0.4.[V vs. SHE] or greater when immersed in a NaCl solution of a concentration of 0.1 mol/L,
    wherein said non-magnetic layer comprises CuPd, and wherein the composition ratio of Cu:Pd is $(100-a_3):a_3$ (where $a_3$ represents atomic %), respectively, the composition range thereof is such that $5\ a_3 \leq 25$, said pinned layer and said free layer comprise one of NiFe and CoNiFe, and wherein the composition ratio of Co:Ni:Fe is $b_3:c_3:d_3$ (where $b_3$, $c_3$ and $d_3$ represent atomic %), respectively, the composition ranges thereof are such that $0 \leq b_3 \leq 75$, $15 \leq c_3 \leq 95$ and $5 \leq d_3 \leq 40$ (where $b_3+c_3+d_3=100$ atomic %), and said magnetoresistive head detects magnetic signals while in contact with a tape-formed magnetic recording medium.

6. The magnetoresistive head according to claim 5, wherein said magnetic sensor element is mounted on a rotary drum and detects magnetic signals while contacting said tape-formed magnetic recording medium by a helical scan method.

7. A magnetoresistive head, comprising:

a spin-valve film as a magnetic sensor element for detecting magnetic signals while in contact with a magnetic recording medium, said spin-valve film having a structure in which an anti-ferromagnetic layer, a pinned layer in which the direction of magnetization is pinned in a predetermined direction by an exchange-coupling magnetic field at work, between itself and said anti-ferromagnetic layer, a free layer in which the direction of magnetization changes in accordance with an external magnetic field, and a non-magnetic layer for magnetically isolating said pinned layer and said free layer are layered, wherein in said spin-valve film, each of said anti-ferromagnetic layer, said pinned layer said free layer and said non-magnetic layer has a corrosion potential relative to a standard hydrogen electrode of +0.4. [V vs. SHE] or greater when immersed in a NaCl solution of a concentration of 0.1 mol/L;

wherein said non-magnetic layer comprises CuPd, and wherein the composition ratio of Cu:Pd is $(100-a_3):a_3$ (where $a_3$ represents atomic %), respectively, the composition range thereof is such that $5 \leq a_3 \leq 25$, said pinned layer and said free layer comprise one of NiFe and CoNiFe, and wherein the composition ratio of Co:Ni:Fe is $b_3:c_3:d_3$ (where $b_3$, $c_3$ and $d_3$ represent atomic %), respectively, the composition ranges thereof are such that $0 \leq b_3 \leq 75$, $15 \leq c_3 \leq 95$ and $5 \leq d_3 \leq 40$ (where $b_3+c_3+d_3=100$ atomic %), and said magnetoresistive head detects magnetic signals while in contact with a tape-formed magnetic recording medium.

8. The magnetoresistive head according to claim 7, wherein said magnetic sensor element is mourned on a rotary drum and detects magnetic signals while contacting said tape-formed magnetic recording medium by a helical scan method.

9. A magnetoresistive head, comprising:

a spin-valve film as a magnetic sensor element for detecting magnetic signals while in contact with a magnetic recording medium, said spin-valve film having a structure in which an anti-ferromagnetic layer, a pinned layer in which the direction of magnetization is pinned in a predetermined direction by an exchange-coupling magnetic field at work between itself and said anti-ferromagnetic layer, a free layer in which the direction of magnetization changes in accordance with an external magnetic field and a non-magnetic layer for magnetically isolating said pinned layer and said free layer are layered, wherein said spin-valve film has a corrosion potential relative to a standard hydrogen electrode of +0.4. [V vs. SHE] or greater when immersed in a NaCl solution of a concentration of 0.1 mol/L, wherein said non-magnetic layer comprises CuPt, and wherein the composition ratio of Cu:Pt is $(100-a_4):a_4$ (where $a_4$ represents atomic %), respectively, the composition range thereof is such that $5 \leq a_4 \leq 20$, said pinned layer and said free layer comprise one of NiFe and CoNiFe, and wherein the composition ratio of Co:Ni:Fe is $b_4:c_4:d_4$ (where $b_4$, $c_4$ and $d_4$ represent atomic %), respectively, the composition ranges thereof are such that $0 \leq b_4 \leq 75$, $15 \leq c_4 \leq 95$ and $5 \leq d_4 \leq 40$ (where $b_4+c_4+d_4=100$ atomic %), and said magnetoresistive head detects magnetic signals while in contact with a tape-formed magnetic recording medium.

10. The magnetoresistive head according to claim 9, wherein said magnetic sensor element is mounted on a rotary drum and detects magnetic signals while contacting said tape-formed magnetic recording medium by a helical scan method.

11. A magnetoresistive head, comprising:

a spin-valve film as a magnetic sensor element for detecting magnetic signals while in contact with a magnetic recording medium, said spin-valve film having a structure in which an anti-ferromagnetic layer, a pinned layer in which the direction of magnetization is pinned in a predetermined direction by an exchange-coupling magnetic field at work between itself and said anti-ferromagnetic layer, a free layer in which the direction of magnetization changes in accordance with an external magnetic field, and a non-magnetic layer for magnetically isolating said pinned layer and said free layer are layered, wherein in said spin-valve film, each of said anti-ferromagnetic layer, said pinned layer, said free layer and said non-magnetic layer has a corrosion potential relative to a standard hydrogen electrode of +0.4.[V vs. SHE] or greater when immersed in a NaCl solution of a concentration of 0.1 mol/L, wherein said non-magnetic layer comprises CuPt, and wherein the composition ratio of Cu:Pt is $(100-a_4):a_4$ (where $a_4$ represents atomic %), respectively, the composition range thereof is such that $5 \leq a_4 \leq 20$, said pinned layer and said free layer comprise one of NiFe and CoNiFe, and wherein the composition ratio of Co:Ni:Fe is $b_4:c_4:d_4$ (where $b_4$, $c_4$ and $d_4$ represent atomic %), respectively, the composition ranges thereof are such that $0 \leq b_4 \leq 75$, $15 \leq c_4 \leq 95$ and $5 \leq d_4 \leq 40$ (where $b_4+c_4+d_4=100$ atomic %), and said magnetoresistive head detects magnetic signals while in contact with a tape-formed magnetic recording medium.

12. The magnetoresistive head according to claim 11, wherein said magnetic sensor clement is mounted on a rotary drum and detects magnetic signals while contacting said tape-formed magnetic recording medium by a helical scan method.

13. A magnetoresistive head, comprising:

a spin-valve film as a magnetic sensor element for detecting magnetic signals while in contact with a magnetic recording medium, said spin-valve film having a structure in which an anti-ferromagnetic layer, a pinned layer in which the direction of magnetization is pinned in a predetermined direction by an exchange-coupling magnetic field at work between itself and said anti-ferromagnetic layer, a free layer in which the direction of magnetization changes in accordance with an external magnetic field and a non-magnetic layer for magnetically isolating said pinned layer and said free layer are layered, wherein said spin-valve film has a corrosion potential relative to a standard hydrogen electrode of +0.4. [V vs. SHE] or greater when immersed in a NaCl solution of a concentration of 0.1 mol/L, wherein said non-magnetic layer comprises CuRu, and wherein the composition ratio of Cu:Ru is $(100-a_5):a_5$ (where $a_5$ represents atomic %), respectively, the composition range thereof is such that $3 \leq a_5 \leq 15$, said pinned layer and said free layer comprise one of NiFe and CoNiFe, and wherein the composition ratio of Co:Ni:Fe is $b_5:c_5:d_5$ (where $b_5$, $c_5$ and $d_5$ represent atomic %), respectively, the composition ranges thereof are such that $0 \leq b_5 \leq 75$, $15 \leq c_5 \leq 95$ and $5 \leq d_5 \leq 40$ (where $b_5+c_5+d_5=100$ atomic %), and said magnetoresistive head detects magnetic signals while in contact with a tape-formed magnetic recording medium.

14. The magnetoresistive head according to claim 13, wherein said magnetic sensor element is mounted on a rotary drum and detects magnetic signals while contacting said tape-formed magnetic recording medium by a helical scan method.

15. A magnetoresistive head, comprising:
a spin-valve film as a magnetic sensor element for detecting magnetic signals while in contact with a magnetic recording medium, said spin-valve film having a structure in which an anti-ferromagnetic layer, a pinned layer in which the direction of magnetization is pinned in a predetermined direction by an exchange-coupling magnetic field at work between itself and said anti-ferromagnetic layer, a free layer in which the direction of magnetization changes in accordance with an external magnetic field, and a non-magnetic layer for magnetically isolating said pinned layer and said free layer are layered, wherein in said spin-valve film, each of said anti-ferromagnetic layer, said pinned layer, said free layer and said non-magnetic layer has a corrosion potential relative to a standard hydrogen electrode of +0.4.[V vs. SHE] or greater when immersed in a NaCl solution of a concentration of 0.1 mol/L, wherein said non-magnetic layer comprises CuRu, and wherein the composition ratio of Cu:Ru is $(100-a_5):a_5$ (where $a_5$ represents atomic %), respectively, the composition range thereof is such that $3 \leq a_4 \leq 15$, said pinned layer and said free layer comprise one of NiFe and CoNiFe, and wherein the composition ratio of Co:Ni:Fe is $b_5:c_5:d_5$ (where $b_5$, $c_5$ and $d_5$ represent atomic %), respectively, the composition ranges thereof are such that $0 \leq b_5 \leq 75$, $15 \leq c_5 \leq 95$ and $5 \leq d_5 \leq 40$ (where $b_5+c_5+d_5=100$ atomic %), and said magnetoresistive head detects magnetic signals while in contact with a tape-formed magnetic recording medium.

16. The magnetoresistive head according to claim 15, wherein said magnetic sensor element is mounted on a rotary drum and detects magnetic signals while contacting said tape-formed magnetic recording medium by a helical scan method.

17. A magnetoresistive head, comprising:
a spin-valve film as a magnetic sensor element for detecting magnetic signals while in contact with a magnetic recording medium, said spin-valve film having a structure in which an anti-ferromagnetic layer, a pinned layer in which the direction of magnetization is pinned in a predetermined direction by an exchange-coupling magnetic field at work between itself and said anti-ferromagnetic layer, a free layer in which the direction of magnetization changes in accordance with an external magnetic field and a non-magnetic layer for magnetically isolating said pinned layer and said free layer are layered, wherein said spin-valve film has a corrosion potential relative to a standard hydrogen electrode of +0.4. [V vs. SHE] or greater when immersed in a NaCl solution of a concentration of 0.1 mol/L, wherein said non-magnetic layer comprises CuNi, and wherein the composition ratio of Cu:Ni is $(100-a_6):a_6$ (where $a_6$ represents atomic %), respectively, the composition range thereof is such that $25 \leq a_6 \leq 50$, said pinned layer and said free layer comprise one of NiFe and CoNiFe, and wherein the composition ratio of Co:Ni:Fe is $b_6:c_6:d_6$ (where $b_6$, $c_6$ and $d_5$ represent atomic %), respectively, the composition ranges thereof are such that $0 \leq b_6 \leq 75$, $15 \leq c_6 \leq 95$ and $5 \leq d_6 \leq 40$ (where $b_6+c_6+d_6=100$ atomic %), and said magnetoresistive head detects magnetic signals while in contact with a tape-formed magnetic recording medium.

18. The magnetoresistive head according to claim 17, wherein said magnetic sensor element is mounted on a rotary drum and detects magnetic signals while contacting said tape-formed magnetic recording medium by a helical scan method.

19. A magnetoresistive head, comprising:
a spin-valve film as a magnetic sensor element for detecting magnetic signals while in contact with a magnetic recording medium, said spin-valve film having a structure in which an anti-ferromagnetic layer, a pinned layer in which the direction of magnetization is pinned in a predetermined direction by an exchange-coupling magnetic field at work between itself and said anti-ferromagnetic layer, a free layer in which the direction of magnetization changes in accordance with an external magnetic field, and a non-magnetic layer for magnetically isolating said pinned layer and said free layer are layered, wherein in said spin-valve film, each of said anti-ferromagnetic layer, said pinned layer, said free layer and said non-magnetic layer has a corrosion potential relative to a standard hydrogen electrode of +0.4.[V vs. SHE] or greater when immersed in a NaCl solution of a concentration of 0.1 mol/L, wherein said non-magnetic layer comprises CuNi, and wherein the composition ratio of Cu:Ni is $(100-a_6):a_6$ (where $a_6$ represents atomic %), respectively, the composition range thereof is such that $25 \leq a_6 \leq 50$, said pinned layer and said free layer comprise one of NiFe and CoNiFe, and wherein the composition ratio of Co:Ni:Fe is $b_6:c_6:d_6$ (where $b_6$, $c_6$ and $d_6$ represent atomic %), respectively, the composition ranges thereof are such that $0 \leq b_6 \leq 75$, $15 \leq c_6 \leq 95$ and $5 \leq d_6 \leq 40$ (where $b_6+c_6+d_6=100$ atomic %), and said magnetoresistive head detects magnetic signals while in contact with a tape-formed magnetic recording medium.

20. The magnetoresistive head according to claim 19, wherein said magnetic sensor element is mounted on a rotary drum and detects magnetic signals while contacting said tape-formed magnetic recording medium by a helical scan method.

21. A magnetoresistive head, comprising:

a spin-valve film as a magnetic sensor element for detecting magnetic signals while in contact with a magnetic recording medium, said spin-valve film having a structure in which an anti-ferromagnetic layer, a pinned layer in which the direction of magnetization is pinned in a predetermined direction by an exchange-coupling magnetic field at work between itself and said anti-ferromagnetic layer, a free layer in which the direction of magnetization changes in accordance with an external magnetic field and a non-magnetic layer for magnetically isolating said pinned layer and said free layer are layered, wherein said spin-valve film has a corrosion potential relative to a standard hydrogen electrode of +0.4. [V vs. SHE] or greater when immersed in a NaCl solution of a concentration of 0.1 mol/L, wherein said non-magnetic layer comprises CuRh, and wherein the composition ratio of Cu:Rh is $(100-a_7):a_7$ (where $a_7$ represents atomic %), respectively, the composition range thereof is such that $7 \leq a_7 \leq 20$, said pinned layer and said free layer comprise one of NiFe and CoNiFe, and wherein the composition ratio of Co:Ni:Fe is $b_7:c_7:d_7$ (where $b_7$, $c_7$ and $d_7$ represent atomic %), respectively, the composition ranges thereof are such that $0 \leq b_7 \leq 75$, $15 \leq c_7 \leq 95$ and $5 \leq d_7 \leq 40$ (where $b_7+c_7+d_7=100$ atomic %), and said magnetoresistive head detects magnetic signals while in contact with a tape-formed magnetic recording medium.

22. The magnetoresistive head according to claim 21, wherein said magnetic sensor element is mounted on a rotary drum and detects magnetic signals while contacting said tape-formed magnetic recording medium by a helical scan method.

23. A magnetoresistive head, comprising:

a spin-valve film as a magnetic sensor element for detecting magnetic signals while in contact with a magnetic recording medium, said spin-valve film having a structure in which an anti-ferromagnetic layer, a pinned layer in which the direction of magnetization is pinned in a predetermined direction by an exchange-coupling magnetic field at work between itself and said anti-ferromagnetic layer, a free layer in which the direction of magnetization changes in accordance with an external magnetic field, and a non-magnetic layer for magnetically isolating said pinned layer and said free layer are layered, wherein in said spin-valve film, each of said anti-ferromagnetic layer, said pinned layer, said free layer and said non-magnetic layer has a corrosion potential relative to a standard hydrogen electrode of +0.4.[V vs. SHE] or greater when immersed in a NaCl solution of a concentration of 0.1 mol/L, wherein said non-magnetic layer comprises CuRh, and wherein the composition ratio of Cu:Rh is $(100-a_7):a_7$ (where $a_7$ represents atomic %), respectively, the composition range thereof is such that $7 \leq a_7 \leq 20$, said pinned layer and said free layer comprise one of NiFe and CoNiFe, and wherein the composition ratio of Co:Ni:Fe is $b_7:c_7:d_7$ (where $b_7$, $c_7$ and $d_7$ represent atomic %), respectively, the composition ranges thereof are such that $0 \leq b_7 \leq 75$, $15 \leq c_7 \leq 95$ and $5 \leq d_7 \leq 40$ (where $b_7+c_7+d_7=100$ atomic %), and said magnetoresistive head detects magnetic signals while in contact with a tape-formed magnetic recording medium.

24. The magnetoresistive head according to claim 23, wherein said magnetic sensor element is mounted on a rotary drum and detects magnetic signals while contacting said tape-formed magnetic recording medium by a helical scan method.

\* \* \* \* \*